United States Patent
Saito et al.

(10) Patent No.: US 11,642,782 B2
(45) Date of Patent: May 9, 2023

(54) CONVEYANCE ROBOT SYSTEM, METHOD FOR CONTROLLING CONVEYANCE ROBOT AND NON-TRANSITORY COMPUTER READABLE STORAGE MEDIUM STORING A ROBOT CONTROL PROGRAM

(71) Applicant: TOYOTA JIDOSHA KABUSHIKI KAISHA, Toyota (JP)

(72) Inventors: Fuminori Saito, Nagoya (JP); Atsunori Kobayashi, Tajimi (JP); Akihiro Kimura, Toyota (JP); Hidenori Yabushita, Seto (JP); Fukashi Andoh, Toyota (JP); Yoshihiro Okumatsu, Nagakute (JP); Takeshi Nishida, Nagoya (JP); Akihito Goto, Nagoya (JP); Reoto Uetake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 17/092,673

(22) Filed: Nov. 9, 2020

(65) Prior Publication Data

US 2021/0170582 A1   Jun. 10, 2021

(30) Foreign Application Priority Data

Dec. 9, 2019   (JP) .............................. JP2019-222492

(51) Int. Cl.
*B25J 9/16* (2006.01)
*B25J 5/00* (2006.01)
(Continued)

(52) U.S. Cl.
CPC ............... *B25J 9/162* (2013.01); *B25J 5/007* (2013.01); *B25J 9/1676* (2013.01); *B25J 13/08* (2013.01);
(Continued)

(58) Field of Classification Search
CPC ... B25J 21/00; B25J 9/162; B25J 5/007; B25J 5/02; B25J 9/1676; B25J 9/1674;
(Continued)

(56) References Cited

U.S. PATENT DOCUMENTS 6,019,563 A * 2/2000 Murata ................ B23Q 7/1436
414/940
2015/0306767 A1* 10/2015 Saito ........................ B25J 9/162
901/1
(Continued)

FOREIGN PATENT DOCUMENTS

JP   H06-077232 U   10/1994
JP   H10-289939 A   10/1998
(Continued)

*Primary Examiner* — Khoi H Tran
*Assistant Examiner* — Tanner L Cullen
(74) *Attorney, Agent, or Firm* — Oliff PLC

(57) ABSTRACT

A conveyance robot system according to the present disclosure includes a conveyance robot, and a robot control unit configured to control an operation of picking up an object performed by the conveyance robot, wherein the robot control unit determines that a movable range area, which is an area outside a safety cover where a robot arm is operated, satisfies a safety ensuring condition that can regard safety of the movable range area as equivalent to the safety inside the safety cover and allow the robot arm to perform a work while projecting toward the shelf.

11 Claims, 17 Drawing Sheets

(51) Int. Cl.
*B25J 13/08* (2006.01)
*B25J 19/06* (2006.01)
*B25J 21/00* (2006.01)
*B65G 1/04* (2006.01)
*G05B 19/4063* (2006.01)
*G05B 19/4155* (2006.01)
*B66F 9/06* (2006.01)

(52) U.S. Cl.
CPC ............ *B25J 13/086* (2013.01); *B25J 19/06* (2013.01); *B25J 21/00* (2013.01); *B65G 1/0435* (2013.01); *G05B 19/4063* (2013.01); *G05B 19/4155* (2013.01); *B66F 9/063* (2013.01); *G05B 2219/45054* (2013.01); *G05B 2219/50193* (2013.01)

(58) Field of Classification Search
CPC ...... B25J 13/086; B25J 9/1664; B25J 9/1651; B25J 13/08; B65G 1/0407; B65G 1/0421; B65G 1/0435; B65G 1/1375; G05B 19/4063; G05B 19/4155; G05B 2219/40202; G05B 2219/40298
See application file for complete search history.

(56) References Cited

U.S. PATENT DOCUMENTS

| | | | |
|---|---|---|---|
| 2018/0057283 | A1 | 3/2018 | Peters et al. |
| 2018/0265297 | A1* | 9/2018 | Nakano ................... B66F 9/06 |
| 2019/0091870 | A1* | 3/2019 | Hino ...................... B25J 9/1687 |
| 2019/0094017 | A1 | 3/2019 | Wakabayashi et al. |
| 2019/0111561 | A1* | 4/2019 | Isobe ....................... B25J 19/06 |
| 2020/0001460 | A1* | 1/2020 | Sato ....................... B25J 9/1676 |
| 2020/0164516 | A1* | 5/2020 | Lehment ................. F16P 3/142 |
| 2021/0245366 | A1* | 8/2021 | Tanaka ................... B25J 9/1697 |
| 2022/0041376 | A1* | 2/2022 | Chen .................... B65G 1/1378 |
| 2022/0063100 | A1* | 3/2022 | Moriguchi ............ B25J 9/1661 |

FOREIGN PATENT DOCUMENTS

| | | |
|---|---|---|
| JP | H11-024750 A | 1/1999 |
| JP | 2003-063608 A | 3/2003 |
| JP | 2019-025555 A | 2/2019 |
| JP | 2019-058993 A | 4/2019 |

* cited by examiner

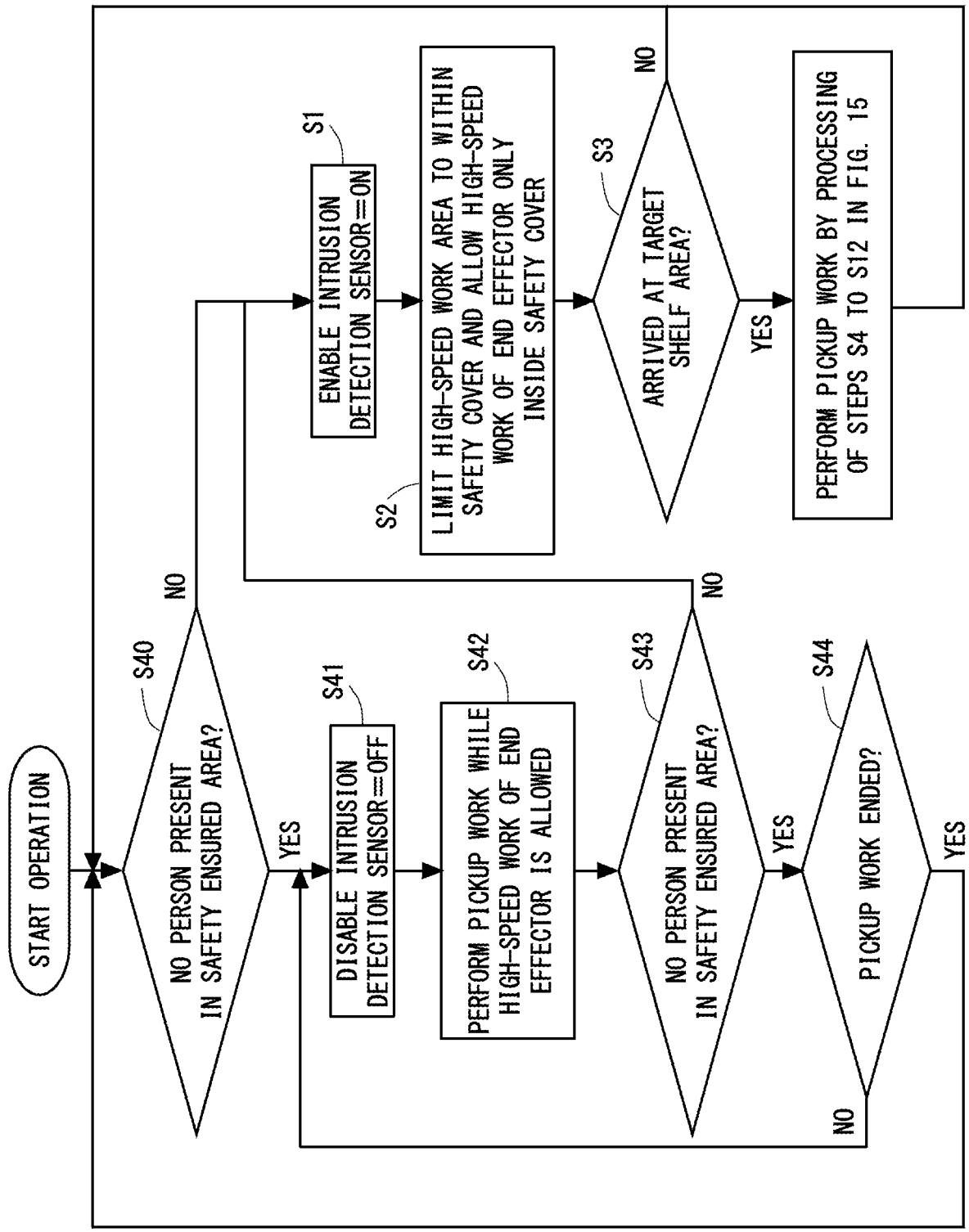

CONVEYANCE ROBOT SYSTEM, METHOD FOR CONTROLLING CONVEYANCE ROBOT AND NON-TRANSITORY COMPUTER READABLE STORAGE MEDIUM STORING A ROBOT CONTROL PROGRAM

CROSS REFERENCE TO RELATED APPLICATIONS

This application is based upon and claims the benefit of priority from Japanese patent application No. 2019-222492, filed on Dec. 9, 2019, the disclosure of which is incorporated herein in its entirety by reference.

BACKGROUND

The present disclosure relates to a conveyance robot system, a method for controlling a conveyance robot and a non-transitory computer readable storage medium storing a robot control program, and relates to a conveyance robot system, a method for controlling a conveyance robot and a non-transitory computer readable storage medium storing a robot control program that works in cooperation with a person in the same space.

Recently, automation of material handling has advanced in distribution warehouses or factories. In this automation, conveyance robots to handle materials are used. In addition, the conveyance robot often works in cooperation with a person. An example of a conveyance robot working in cooperation with a person is disclosed in Japanese Unexamined Patent Application Publication No. 2019-025555.

The workpiece conveyance apparatus disclosed in Japanese Unexamined Patent Application Publication No. 2019-025555 includes a base, a robot arm that includes a workpiece holding part capable of holding a workpiece which is provided integrally with the base and that moves the workpiece held by the workpiece holding part, and a cover body which is provided integrally with the base to isolate an operating area of the robot arm from the outside. In the workpiece conveyance apparatus disclosed in Japanese Unexamined Patent Application Publication No. 2019-025555, by providing the cover body so as to surround the robot arm, the robot arm can perform a quick work even in an environment where persons and robot coexist.

SUMMARY

However, for example, in a situation where a person can insert his/her hand inside a wall, there is a problem that it is difficult for the workpiece conveying apparatus to perform a quick work while maintaining safety by simply surrounding the robot arm with the cover body.

The present disclosure has been made to solve such a problem. An object of the present disclosure is to perform a work using a robot arm at a high speed while improving safety in an environment where persons and robots coexist.

An example aspect of the present disclosure is a conveyance robot system including: a conveyance robot; and a robot control unit configured to control an operation of picking up an object performed by the conveyance robot. The conveyance robot includes: a robot arm to which an end effector for holding the object is attached and configured to move a position of the end effector; a wheel configured to move a housing; a safety cover configured to cover the housing and provided with an arm opening in a predetermined surface of the conveyance robot from which the robot arm is extended and in which the robot arm is retracted; a storage box space for placing a storage box for storing the picked up object in the safety cover; an intrusion detection sensor configured to detect an intrusion of an object into the arm opening; and a distance sensor configured to measure a clearance distance indicating a distance between an arm entry/exit surface and a shelf, the arm entry/exit surface being a surface of the conveyance robot in which the arm opening is provided from among surfaces of the conveyance robot constituting the safety cover, and the object being stored in the shelf. The robot control unit is configured to determine that a movable range area, which is an area outside the safety cover where the robot arm is operated, satisfies a safety ensuring condition that can regard safety of the movable range area as equivalent to the safety inside the safety cover and allow the robot arm to perform a work while projecting toward the shelf.

Another example aspect of the present disclosure is a method for controlling a conveyance robot including: a robot arm to which an end effector for holding the object is attached and configured to move a position of the end effector; a wheel configured to move a housing; a safety cover configured to cover the housing and provided with an arm opening in a predetermined surface of the conveyance robot from which the robot arm is extended and in which the robot arm is retracted; a storage box space for placing a storage box for storing the picked up object in the safety cover; an intrusion detection sensor configured to detect an intrusion of an object into the arm opening; and a distance sensor configured to measure a clearance distance indicating a distance between an arm entry/exit surface and a shelf, the arm entry/exit surface being a surface of the conveyance robot in which the arm opening is provided from among surfaces of the conveyance robot constituting the safety cover, and the object being stored in the shelf. The method includes determining that a movable range area, which is an area outside the safety cover where the robot arm is operated, satisfies a safety ensuring condition that can regard safety of the movable range area as equivalent to the safety inside the safety cover and allow the robot arm to perform a work while projecting toward the shelf.

Another example aspect of the present disclosure is a non-transitory computer readable storage medium storing a robot control program executed by a robot control unit in a conveyance robot system comprising: a conveyance robot; and the robot control unit configured to control an operation of picking up an object performed by the conveyance robot, wherein the conveyance robot comprises: a robot arm to which an end effector for holding the object is attached and configured to move a position of the end effector; a wheel configured to move a housing; a safety cover configured to cover the housing and provided with an arm opening in a predetermined surface of the conveyance robot from which the robot arm is extended and in which the robot arm is retracted; a storage box space for placing a storage box for storing the picked up object in the safety cover; an intrusion detection sensor configured to detect an intrusion of an object into the arm opening; and a distance sensor configured to measure a clearance distance indicating a distance between an arm entry/exit surface and a shelf, the arm entry/exit surface being a surface of the conveyance robot in which the arm opening is provided from among surfaces of the conveyance robot constituting the safety cover, and the object being stored in the shelf, wherein the distance sensor is disposed at a fixed height of the shelf in a horizontal direction and at a height of the shelf corresponding to a part to be measured, and the robot control program is configured to disable the intrusion detection sensor and to allow the robot arm to perform a work by protruding from the shelf when the clearance distance becomes less than or equal to a high-speed work allowance threshold.

According to the conveyance robot system, a method for controlling a conveyance robot and a non-transitory computer readable storage medium storing a robot control program, it is possible to allow a high-speed operation of the robot arm only in a state in which there is no danger of a part of a human body entering a work area of the robot arm.

According to the present disclosure, it is possible to perform a work using a robot arm at a high speed while improving safety in an environment where persons and robots coexist.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 17 is a flowchart for explaining an operation of the conveyance robot according to a fourth embodiment.

DESCRIPTION OF EMBODIMENTS

First Embodiment

Figure 1:
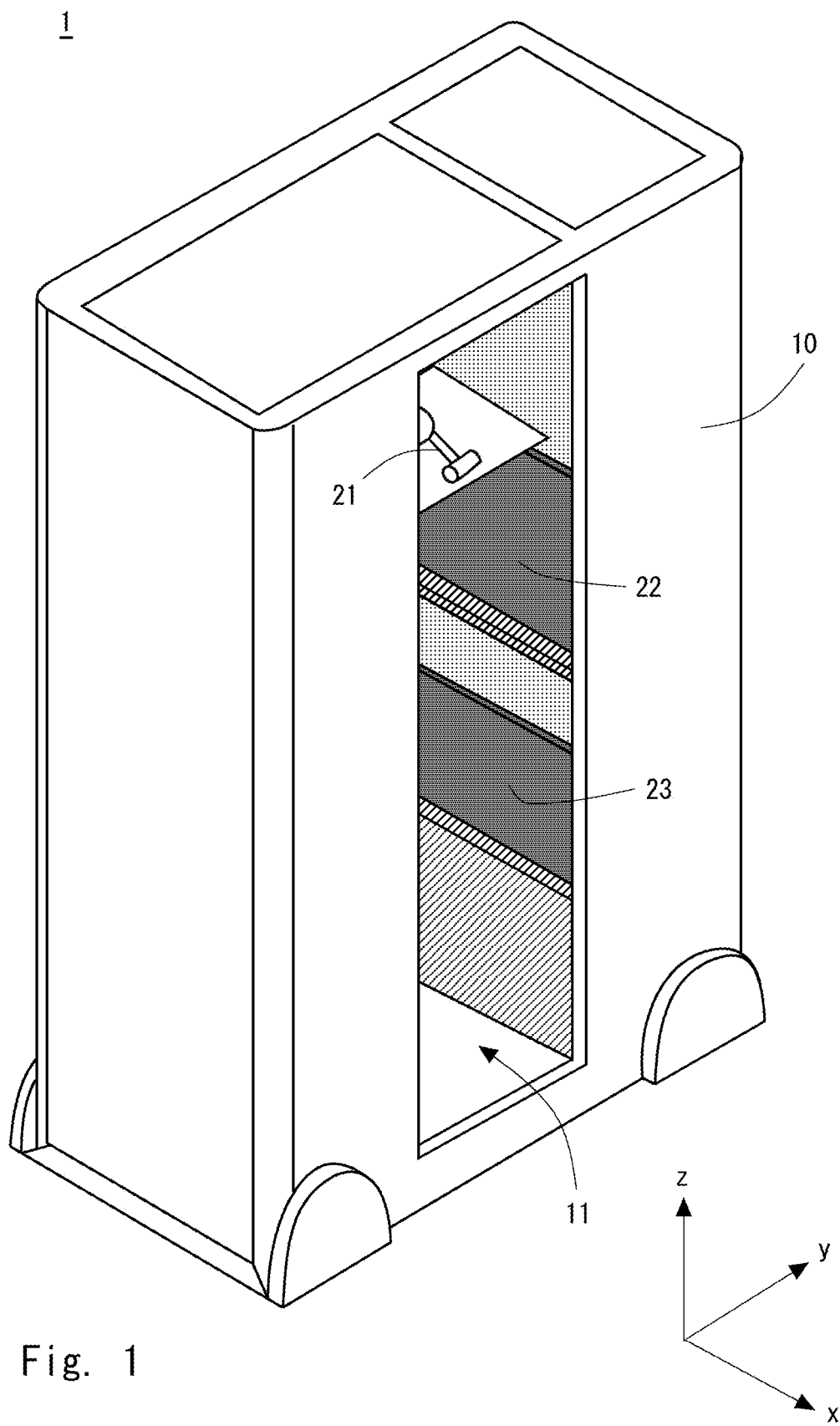
FIG. 1 shows an overview of an external appearance of a conveyance robot according to a first embodiment.

FIG. 1 shows an overview of an external appearance of a conveyance robot 1 according to a first embodiment. As shown in FIG. 1, the conveyance robot 1 according to the first embodiment is configured such that a housing, which will be described later, is covered by a safety cover 10. A robot arm 21 is attached to the housing covered by the safety cover 10. The robot arm 21 picks up an object stored in a shelf by the arm being extended from and retracted in an arm opening part 11 provided in a predetermined surface of the safety cover 10. The storage boxes 22 and 23 are placed on the housing inside the safety cover 10. The storage boxes 22 and 23 can be taken in and out by, for example, a worker or by a mechanism of the conveyance robot 1.

As shown in FIG. 1, the conveyance robot 1 has a substantially rectangular shape in a top view. In the following description, the short side direction of the rectangle is defined as an x direction, the long side direction is defined as a y direction, and the height direction of the conveyance robot 1 is defined as a z direction. A surface of the conveyance robot 1 in the x direction faces a shelf surface, which is a surface of the shelf where objects are loaded and unloaded. The arm opening 11 is provided in one surface of the conveyance robot 1 in the x direction. In the following description, regarding the conveyance robot 1, the movement in the x direction is defined as the lateral movement, the movement in the y direction is defined as the longitudinal movement, and the movement in the z direction is defined as the vertical movement.

Figure 2:
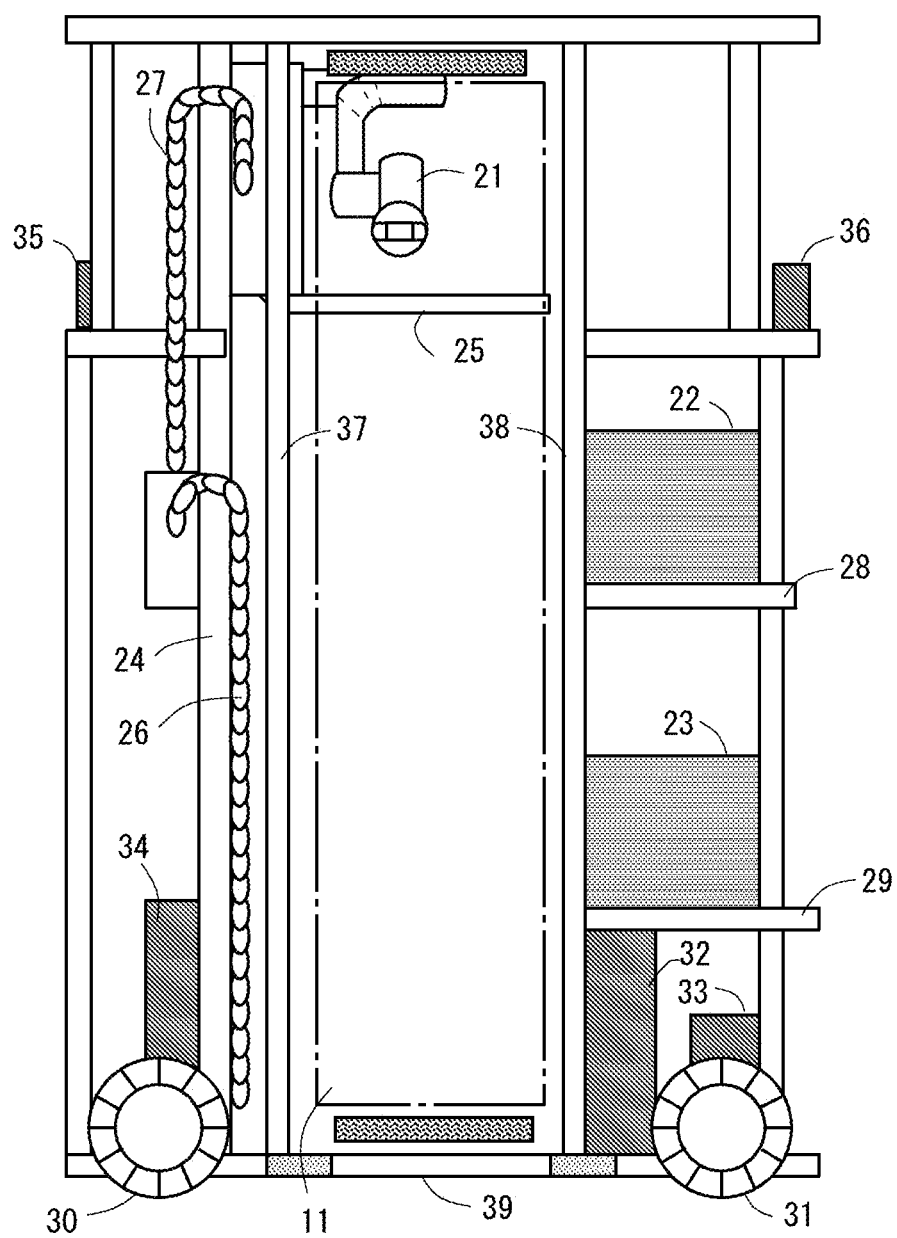
FIG. 2 is an overview of a housing of the conveyance robot according to the first embodiment.

Next, the housing contained in the safety cover 10 will be described. FIG. 2 shows an overview of the housing 20 of the conveyance robot according to the first embodiment. In FIG. 2, main components constituting the housing are shown, but the structure of the housing is not limited to the structure shown in FIG. 2.

As shown in FIG. 2, the housing 20 according to the first embodiment is composed of a plurality of supports, beams, and shelves as a frame above a chassis 39, and a control circuit board, wheels, a robot arm, and various sensors attached to the frame.

In the example shown in FIG. 2, the chassis 39 is provided at a lower part of the housing 20. The chassis 39 is provided with a battery box 32 and circuit boxes 33 and 34. The circuit box 33 is a power source for operating the conveyance robot 1. Each of the circuit boxes 33 and 34 includes a control circuit for controlling the conveyance robot 1, a drive circuit for driving the wheels, a circuit that implements a communication unit for communicating with the host system, and so on. Wheels 30 and 31 are provided to be connected to the driving circuits of the circuit boxes 33 and 34. In FIG. 2, only two wheels are shown as the wheels 30 and 31, which can be observed when viewed from the side surface of the conveyance robot 1. However, two wheels are provided on each side of the housing 20 of the conveyance robot 1, for a total of four wheels. The wheels 30 and 31 are mekhanam wheels in which small wheels are arranged along the outer periphery. The wheels 30 and 31 move the conveyance robot 1 in the lateral direction by the small wheels. Further, the conveyance robot 1 can also perform a bending motion by utilizing a difference in the rotational speed of the wheels.

In the example shown in FIG. 2, the frame is provided with storage box shelf plates 28 and 29. In the example shown in FIG. 2, the storage box 22 is placed on the storage box shelf plate 28, and the storage box 23 is placed on the storage box shelf plate 29. The storage boxes 22 and 23 are replaceable boxes for storing objects picked up by the robot arm 21.

As shown in FIG. 2, the housing 20 is provided with an arm lifting column 24. In the example shown in FIG. 2, the arm lifting column 24 is installed from the chassis 39 at the bottom to the ceiling of the housing 20. The arm lifting column 24 is provided with the robot arm 21, and the robot arm 21 is vertically moved along the arm lifting column 24. The detailed configuration of the robot arm 21 will be described later. A work stage 25 is provided corresponding to the robot arm 21 and moves up and down independently of the robot arm 21. Power and control signals are transmitted to the robot arm 21 through flexible wires 26 and 27.

In the example shown in FIG. 2, the surrounding environment sensors 35 and 36 are provided at an upper part of the housing 20. The surrounding environment sensors 35 and 36 are sensors for detecting persons and objects around the conveyance robot 1. The conveyance robot 1 performs operations such as autonomous movement and danger avoidance using the surrounding environment sensors 35 and 36.

In the example shown in FIG. 2, a part the arm opening 11 is provided is indicated by a chain line. The housing 20 is provided with intrusion detection sensors 40 such that a detection signal crosses the arm opening 11 in the longitudinal direction (the vertical direction of the drawing). The intrusion detection sensor 40 constitutes one detection element by sensors provided at opposing positions. In other words, one of the sensors provided at the opposing positions is a transmitting side of the detection signal and the other is a receiving side of the detection signal. When the intrusion detection sensor 40 detects an intrusion of an intruding object into the safety cover 10, the conveyance robot 1 reduces an operation speed of the robot arm 21. The reduction of the operation speed of the robot arm 21 due to the intrusion of the intruding object into the safety cover 10 is performed by, for example, an arithmetic unit described later.

In the conveyance robot 1 according to the first embodiment, a distance sensor 41 is attached to the chassis 39. The distance sensor 41 is provided, for example, at a position lower than the bottom of the arm opening 11. The distance sensor 41 is a sensor for measuring a distance between the surface of the safety cover provided with the arm opening 11 and the shelf surface.

Figure 3:
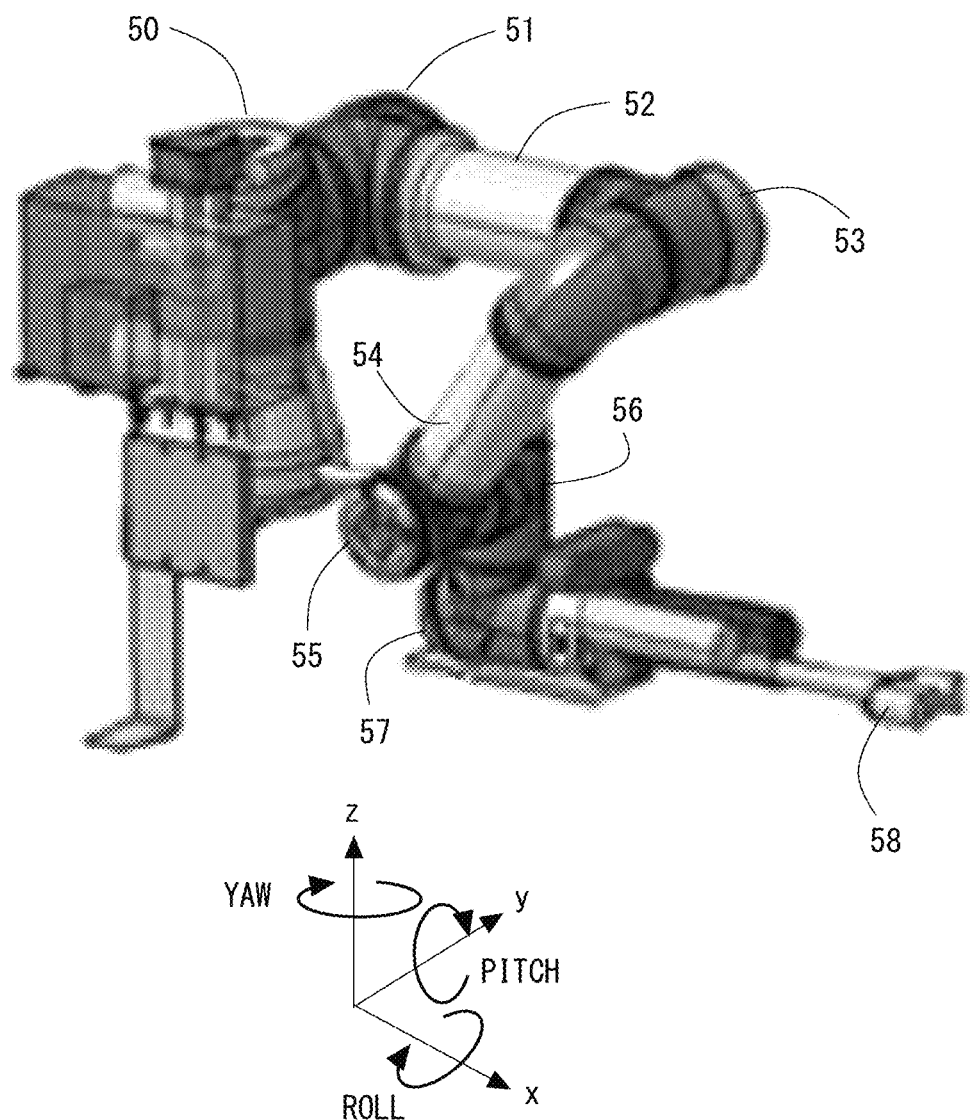
FIG. 3 is an overview of a robot arm of the conveyance robot according to the first embodiment.

Next, the robot arm 21 will be described in detail. FIG. 3 shows an overview of the robot arm 21 of the conveyance robot according to the first embodiment. As shown in FIG. 3, the robot arm 21 includes actuators 50, 51, 53, 55, 56, and 57, arms 52 and 54, and an end effector 58. In the description of FIG. 3, the x direction, the y direction, and the z direction are orthogonal to each other, and the vertical movement direction of the arm is referred to as a z direction, the rotation direction around the z direction is referred to as a yaw, the rotation direction around the y direction is referred to as a pitch, and the rotation direction around the x direction is referred to as a roll.

With the arm posture of FIG. 3, the actuator 50 rotates the arm 52 in the yaw direction. The actuator 51 is connected to the actuator 50 and rotates the arm 52 in the pitch direction. The actuator 53 is provided at an end part of the arm 52 and rotates the arm 54 in the pitch direction. The actuator 55 is provided at an end part of the arm 54 and rotates the end effector 58 in the pitch direction. The actuator 56 is connected to the actuator 55 and rotates the end effector 58 in the yaw direction. The actuator 57 is connected to the actuator 56 and rotates the end effector 58 in the roll direction. The end effector 58 has a holding part for holding an object to be picked up at its leading end.

Figure 4:
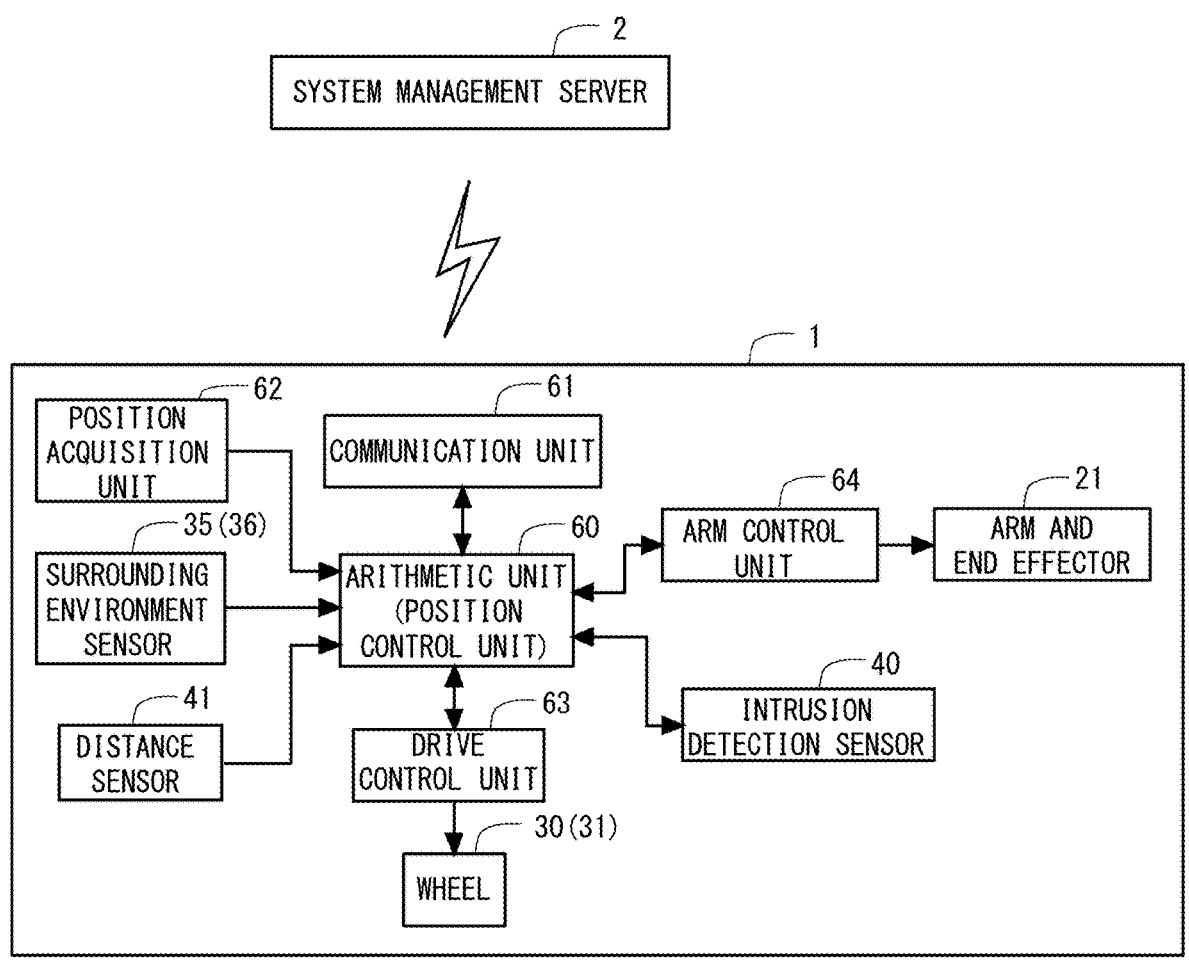
FIG. 4 is a block diagram for explaining an example of a conveyance robot system according to the first embodiment.

Next, the structure of the conveyance robot system according to the first embodiment will be described. FIG. 4 is a block diagram for explaining an example of the conveyance robot system according to the first embodiment. As shown in FIG. 4, the conveyance robot 1 and a system management server 2 for managing the conveyance robot 1 are provided in the conveyance robot system. In the conveyance robot system according to the first embodiment, the system management server 2 provides an operation instruction to the conveyance robot 1, and the conveyance robot 1 operates in accordance with the instruction provided from the system management server 2.

Here, the contents of the operation instruction transmitted and received between the conveyance robot 1 and the system management server 2 vary depending on how much processing is shared between the conveyance robot 1 and the system management server 2 in regard to the processing to cause the conveyance robot 1 to operate. Specifically, when the system management server 2 acquires a position of the conveyance robot 1 and gives detailed operation instructions of the robot arm 21, the system management server 2 calculates a position command value and a speed command value to be provided to a motor or the actuator, and the conveyance robot 1 is only in charge of processing such that the position command value and the speed command value calculated by the system management server 2 are passed to the control unit of the motor or the actuator. For example, the system management server 2 may provide, to the conveyance robot 1, only the position and a product name of the object to be picked up. In this case, the conveyance robot 1 is in charge of many processes such as calculating a moving direction and a moving amount from the position of the object received from the system management server 2 and the current position of this conveyance robot 1. As described above, in the conveyance robot system according to the first embodiment, the ratio of the processing load to be carried out by the system management server 2 to the processing load to be carried out by the conveyance robot 1 can be freely determined by the specifications. That is, the processing blocks and the processing contents of each processing block shown in the block diagram of FIG. 4 are an example, and the processing described later may be performed as the entire system.

In the example shown in FIG. 4, the conveyance robot 1 includes a robot control unit (e.g., an arithmetic unit 60), a communication unit 61, a position acquisition unit 62, the surrounding environment sensors 35 and 36, the distance sensor 41, a drive control unit 63, the wheels 30 and 31, an arm control unit 64, the robot arm 21, and the intrusion detection sensors 40.

The arithmetic unit 60 controls the conveyance robot 1 based on information received from the position acquisition unit 62, the surrounding environment sensors 35 and 36, the intrusion detection sensors 40, the distance sensor 41, and the communication unit 61. The arithmetic unit 60 is, for example, a CPU (Central Processing Unit) capable of executing a program. As described above, in the conveyance robot system according to the first embodiment, the load of the processing carried out by the arithmetic unit 60 is determined by the specifications of the system. Further, since the arithmetic unit 60 controls the position of the conveyance robot 1, the position of the robot arm 21, and so on, the arithmetic unit 60 may be regarded as a position control unit.

The communication unit 61 communicates with the system management server 2. Although FIG. 4 shows an example in which the communication unit 61 and the system management server 2 communicate with each other using radio signals, the communication unit 61 and the system management server 2 may communicate with each other using wired signals.

The position acquisition unit 62 is not shown in FIG. 2. The position acquisition unit 62 acquires position information of the conveyance robot 1, and outputs marker information as the position information, for example, by detecting a marker provided on the shelf. When the marker is used, the position of the conveyance robot 1 is specified by analyzing the marker information in the arithmetic unit 60 or the system management server 2. The position acquisition unit 62 may use a local GPS (Global Positioning System) or the like. In the conveyance robot system, when a higher system acquires the position of the conveyance robot 1 by a camera for photographing the area where the conveyance robot 1 is used, the position acquisition unit 62 may not be used.

The surrounding environment sensors 35 and 36 are sensors such as a laser sensor for detecting an object which detect the presence or absence of a shelf, a person, or an obstacle around the conveyance robot 1. When the surrounding environment sensors 35 and 36 detect a person, the conveyance robot system performs an operation for ensuring the safety of the person during a pickup operation. Details of the operation for ensuring safety will be described later. When an obstacle is detected by the surrounding environment sensors 35 and 36, the conveyance robot system controls the conveyance robot 1 to avoid the detected obstacle.

The distance sensor 41 measures, as a clearance distance, the distance between the shelf surface facing the surface on which the arm opening 11 of the conveyance robot 1 is provided from among the surfaces of the shelf and the surface in which the arm opening 11 of the conveyance robot 1 is provided. In the conveyance robot system according to the first embodiment, the way the robot arm 21 is controlled is switched according to the clearance distance measured by the distance sensor 41. The control switching processing of the robot arm 21 will be described in detail later.

The drive control unit 63 controls the wheels 30 and 31 based on the position command value and the speed command value provided from the arithmetic unit 60. The arm control unit 64 controls the robot arm 21 based on the position command value and the speed command value provided from the arithmetic unit 60. The intrusion detection sensors 40 detect an intrusion of an intruding object from the arm opening 11 into the safety cover 10. In the safety cover 10 according to the first embodiment, when an intruding object is detected by the intrusion detection sensor 40, the operation speed of the robot arm 21 is reduced (e.g., by slowing down the operation speed). A main object of the intrusion detection sensor 40 is to detect a person's hand, arm, or the like, but may detect not only a part of the person but any object.

Next, the operation of the conveyance robot 1 and the system management server 2 in the conveyance robot system according to the first embodiment will be described. In the conveyance robot system according to the first embodiment, as described above, the ratio of the processing load of the conveyance robot 1 to that of the system management server 2 can be freely determined by the specifications. In this description, three operation examples in which the ratios of the processing loads are different from each other will be described as an example.

Figure 5:
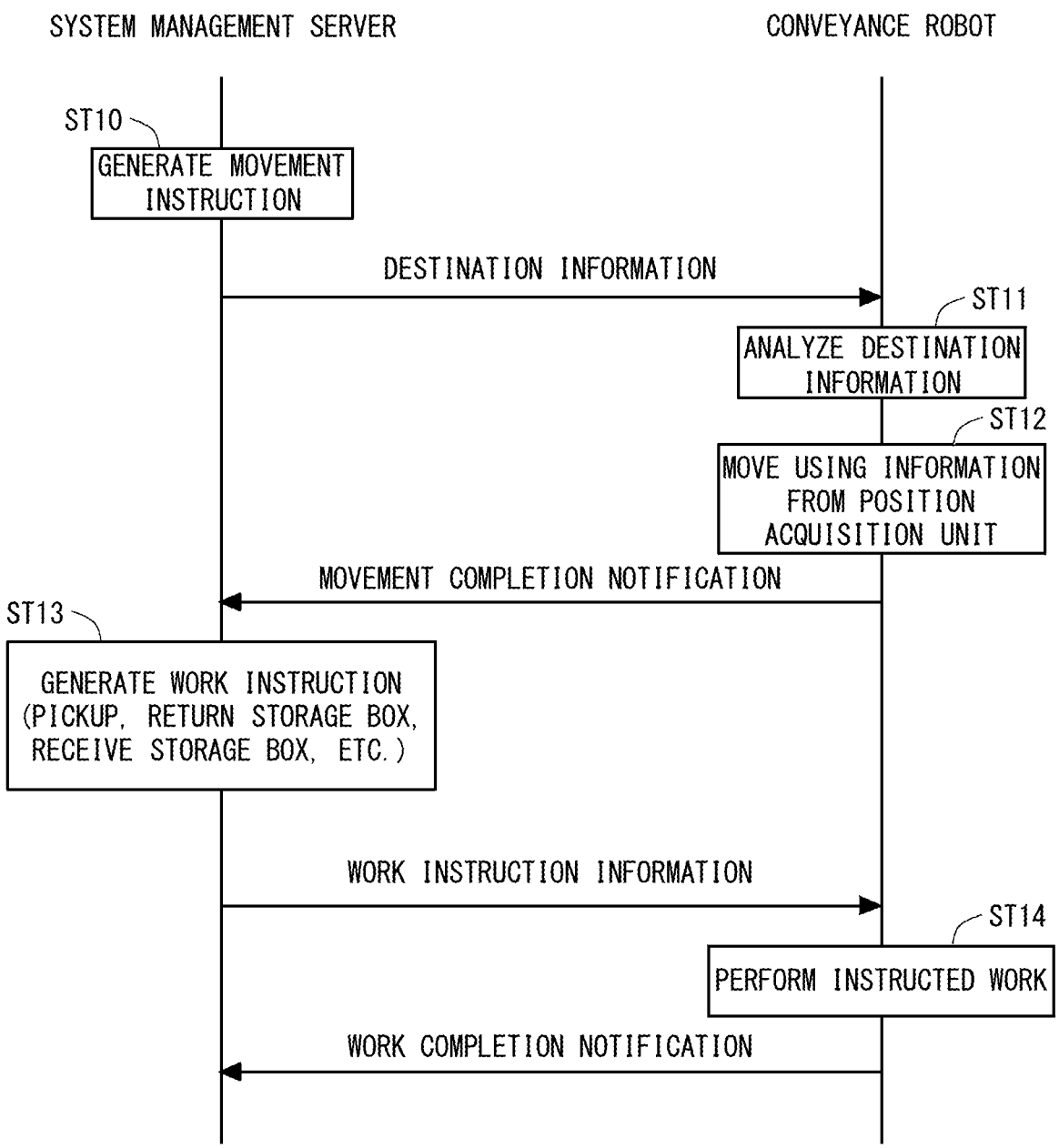
FIG. 5 is a sequence diagram for explaining a first operation example of the conveyance robot system according to the first embodiment.

FIG. 5 is a sequence diagram for explaining a first operation example of the conveyance robot system according to the first embodiment. The first operation example shown in FIG. 5 shows an operation in which the processing load of the conveyance robot 1 is at a medium level. In the first operation example shown in FIG. 5, the system management server 2 generates a movement instruction indicating the position of the object to be picked up for the conveyance robot 1 (Step ST10). Thus, the destination information is transmitted from the system management server 2 to the conveyance robot 1. The conveyance robot 1 analyzes the received destination information, generates a route from the current position of the conveyance robot 1 to the destination, and autonomously moves using the information from the position acquisition unit 62 (Steps ST11 and ST12). When the conveyance robot 1 arrives at the destination, the system management server 2 transmits a movement completion notification to the system management server 2.

In response to receiving the movement completion notification, the system management server 2 generates work instruction information (Step ST13). The work instruction information may include information about an object to be picked up (e.g., shelf position information), an instruction to return a storage box, an instruction to receive a storage box, and the like, depending on the current work step. Then, in response to receiving the work instruction information from the system management server 2, the conveyance robot 1 performs a work using the robot arm 21 (Step ST14). When the work in accordance with the work instruction provided from the system management server 2 is completed, the conveyance robot 1 transmits a work completion notification to the system management server 2.

Figure 6:
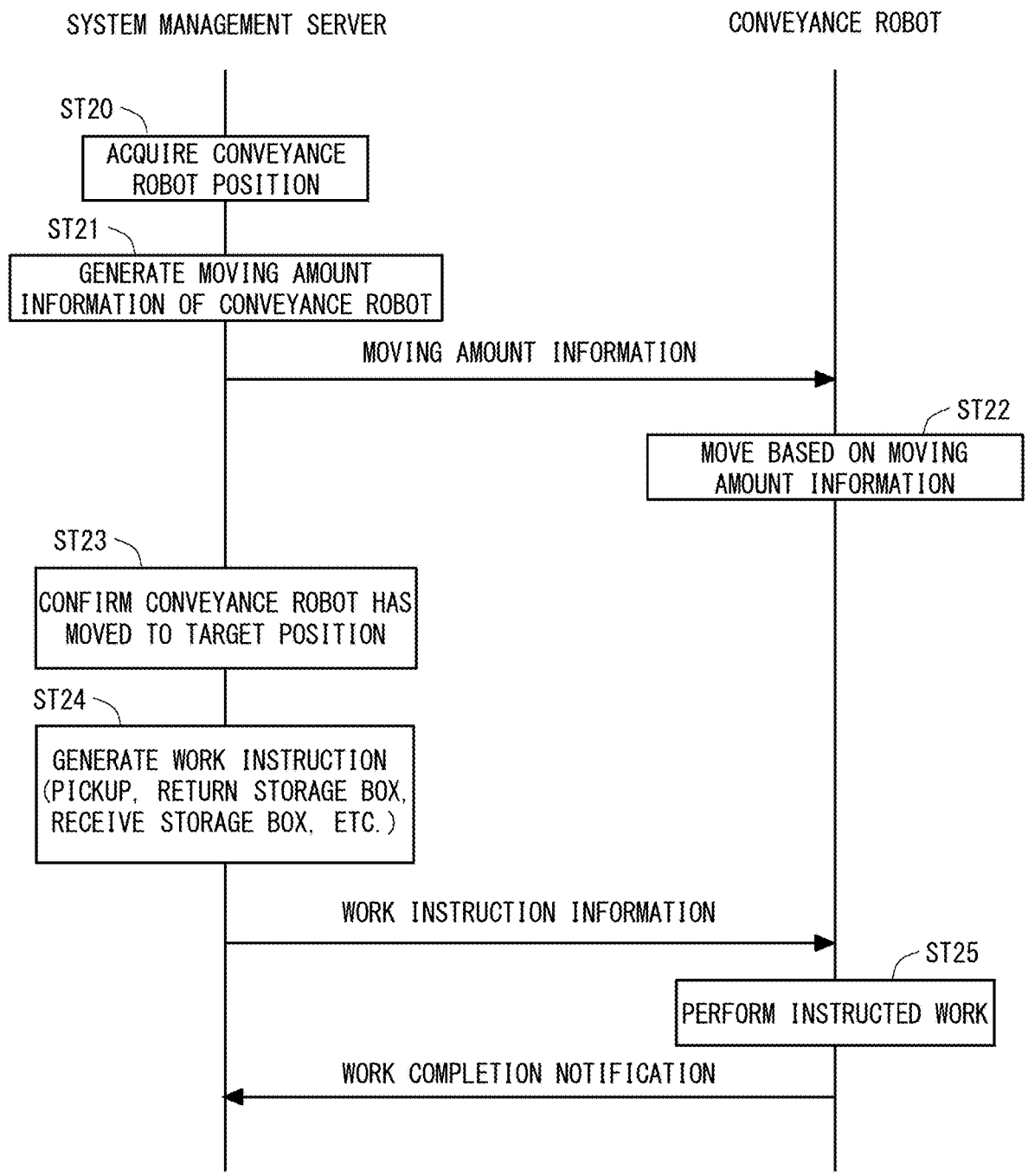
FIG. 6 is a sequence diagram for explaining a second operation example of the conveyance robot system according to the first embodiment.

Next, a second operation example of the conveyance robot system according to the first embodiment will be described. FIG. 6 is a sequence diagram for explaining a second operation example of the conveyance robot system according to the first embodiment. The second operation example shows an operation in which the processing load of the conveyance robot 1 is smaller than that of the first operation example. In the second operation example shown in FIG. 6, first, the system management server 2 acquires the position of the conveyance robot 1 using a private camera or the like (Step ST20). In the acquisition of the position in Step ST20, the system management server 2 may receive, from the conveyance robot 1, the position information acquired using the position acquisition unit 62 of the conveyance robot 1. Next, the system management server 2 generates moving amount information for moving to the destination of the conveyance robot 1 based on the acquired position information (Step ST21). The system management server 2 transmits the moving amount information generated in Step ST21 to the conveyance robot 1. The conveyance robot 1 moves based on the received moving amount information (Step ST22). The processing from Step ST20 to Step ST22 is repeated until the conveyance robot 1 reaches the target position.

When the system management server 2 confirms that the conveyance robot 1 has moved to the target position (Step ST23), the system management server 2 generates a work instruction (Step ST24). The work instruction includes, for example, a shelf position of the object, a pickup instruction including information for specifying a storage box, a storage box return instruction specifying a place to return the storage box, and a storage box receiving instruction specifying a position of the storage box to be received. The system management server 2 transmits the generated work instruction to the conveyance robot 1. The conveyance robot 1 which has received the work instruction performs the work using the robot arm 21 in accordance with the work instruction (Step ST25). The conveyance robot 1 transmits the work completion notification to the system management server 2 in response to the completion of the work.

Figure 7:
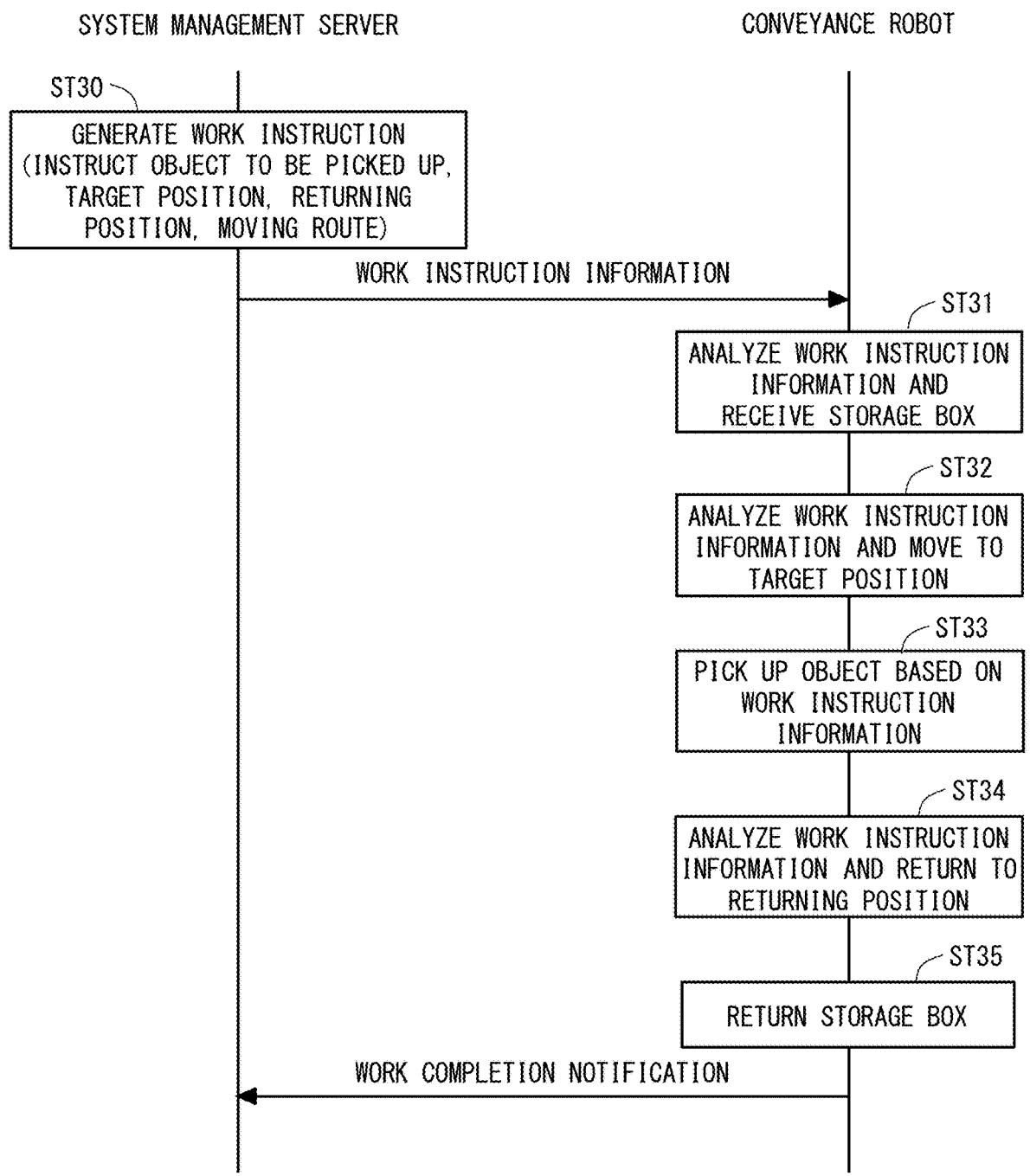
FIG. 7 is a sequence diagram for explaining a third operation example of the conveyance robot system according to the first embodiment.

Next, a third operation example of the conveyance robot system according to the first embodiment will be described. FIG. 7 is a sequence diagram for explaining a third operation example of the conveyance robot system according to the first embodiment. The third operation example of FIG. 7 shows an operation in which the processing load of the conveyance robot 1 is larger than that of the first operation example. In the third operation example shown in FIG. 7, first, the system management server 2 generates a work instruction (Step ST30). The system management server 2 transmits the generated work instruction information to the conveyance robot 1. In the third example, the work instruction information includes, for example, pickup object information including shelf information of the object to be picked up, target position information indicating the position of the target shelf, returning position information indicating the returning position after the pickup, and moving route instruction information indicating a moving route from the current position to the returning position.

The conveyance robot 1 which has received the work instruction information analyzes the work instruction information and receives the storage box (Step ST31). Next, the conveyance robot 1 analyzes the work instruction information to autonomously move to the target position based on the target position information and the moving route instruction information (Step ST32). At this time, the conveyance robot 1 moves autonomously while acquiring the position of the conveyance robot 1 using the position acquisition unit 62, the surrounding environment sensors 35 and 36, and so on. When the conveyance robot 1 arrives at the target position, it picks up the object by referring to the pickup object information (Step ST33). After that, the conveyance robot 1 autonomously moves to the returning position by referring to the returning position information of the work instruction information (Step ST34). When the conveyance robot 1 arrives at the returning position, the conveyance robot 1 returns the storage box containing the object to the predetermined position (Step ST35). When the processing in Step ST35 is completed, the conveyance robot 1 transmits a work completion notification to the system management server 2.

Next, the operation of the conveyance robot 1 picking up an object from a shelf in the conveyance robot system according to the first embodiment will be described in detail. In the conveyance robot system according to the first embodiment, the conveyance robot 1 is provided with a high-speed operation mode and a low-speed operation mode. In the high-speed operation mode, the robot arm 21 is operated at a high speed without limiting the operation speed. In the low speed operation mode, the robot arm 21 is operated at a low speed by limiting the operation speed. Further, the conveyance robot system according to the first embodiment is allowed to control the robot arm 21 in the high-speed operation mode only inside the safety cover 10 and inside an area where safety equivalent to that in the safety cover 10 is confirmed. Thus, in the conveyance robot system according to the first embodiment, the high-speed operation of the robot arm 21 and the improvement of safety of persons are achieved under the environment where the conveyance robot 1 coexists with persons.

Figure 8:
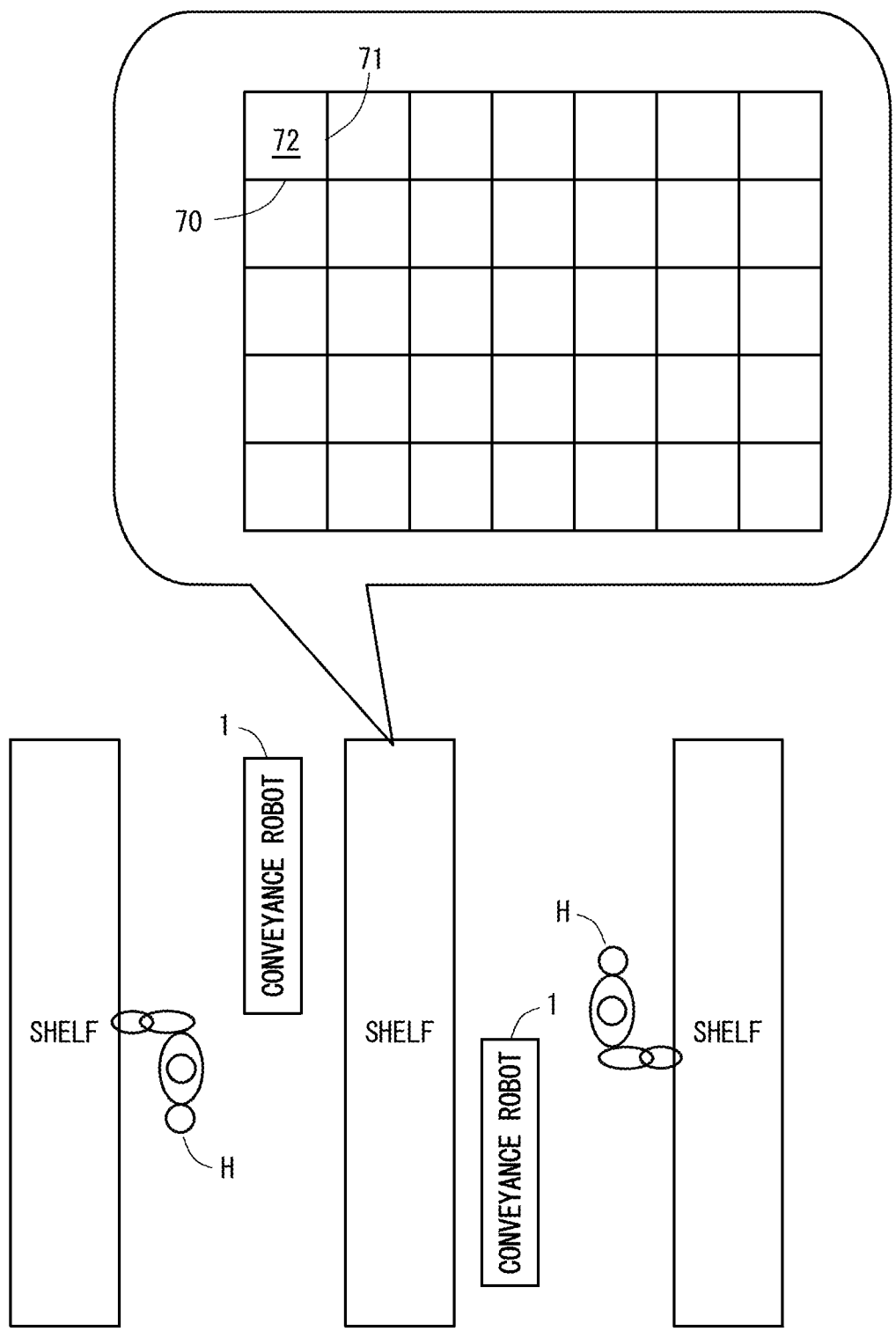
FIG. 8 shows an overview for explaining a warehouse in which the conveyance robot system is operated according to the first embodiment.

Here, a workplace (e.g., a warehouse) to which the conveyance robot system according to the first embodiment is applied will be described. FIG. 8 shows an overview for explaining a warehouse in which the conveyance robot system according to the first embodiment is operated. As shown in FIG. 8, in the conveyance robot system according to the first embodiment, persons H and the conveyance robot 1 are made to coexist in a warehouse or the like having a plurality of shelves. The conveyance robot 1 moves so as to access any of the plurality of shelves. On the other hand, the persons H also freely travel between the plurality of shelves. Therefore, in order to ensure safety when the robot arm 21 of the conveyance robot 1 is operated in the conveyance robot system, it is necessary to separate an area where the robot arm 21 is operated from an area where the persons H perform an operation. However, if the plurality of shelves are divided into those dedicated for robots and those dedicated for persons in order to separate the operation areas of the persons H from that of the conveyance robot 1, there arises a problem that the work efficiency decreases. Thus, in the conveyance robot system according to the first embodiment, by performing the following processing, the safety of the persons H is improved while the persons H and the conveyance robot 1 are operated together without limiting the operation speed of the robot arm 21.

As shown in FIG. 8, in the conveyance robot system according to the first embodiment, each of workpiece storage areas 72 is defined as an area in which the shelf is divided by the shelf plate 70 and the workpiece partition plate 71, and the adjacent workpiece storage areas 72 are spatially separated. An object to be picked up is stored in the workpiece storage area 72.

Figure 9:
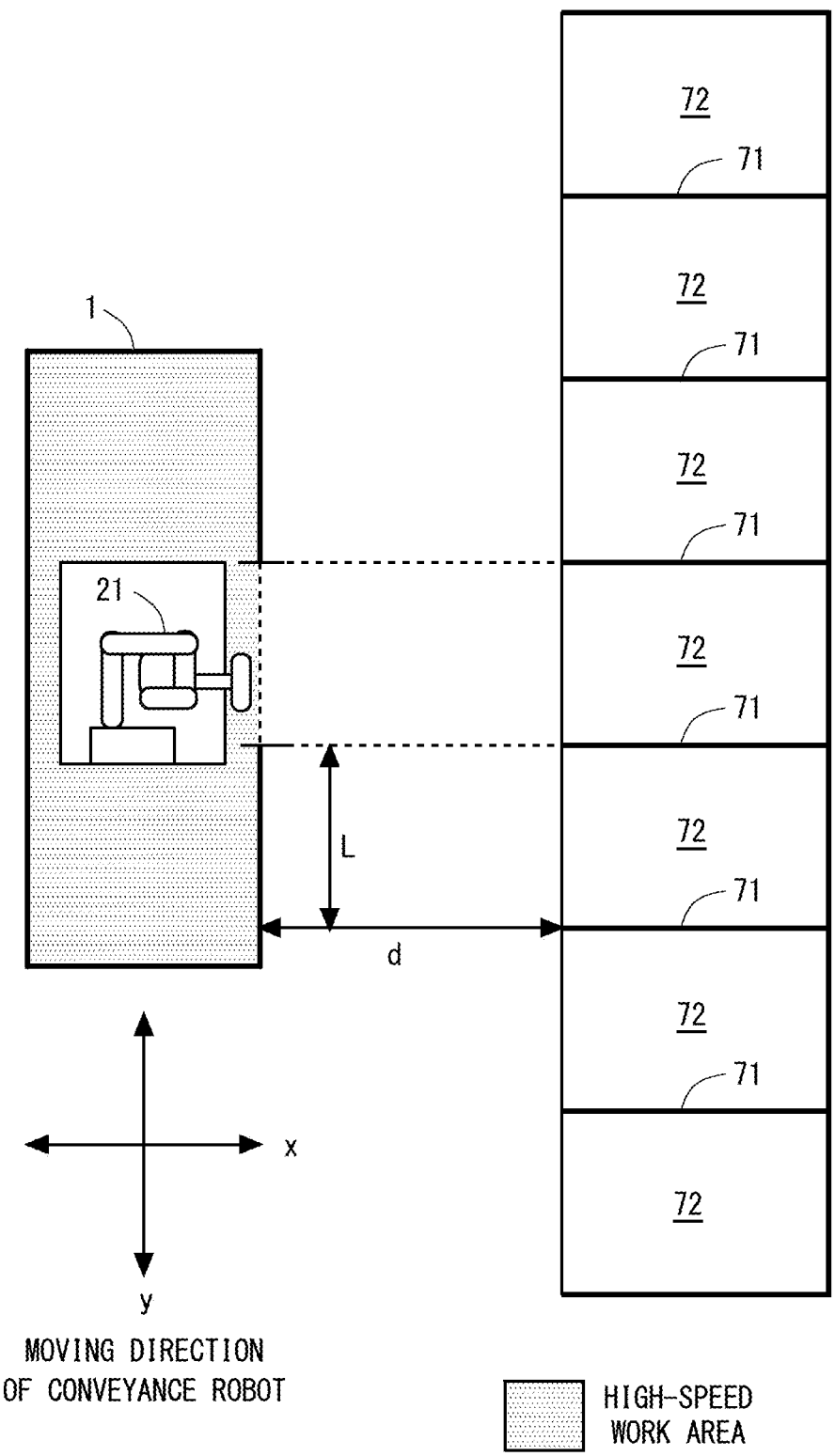
FIG. 9 is a diagram for explaining an operation state of a pickup work preparation step in the conveyance robot system according to the first embodiment.
Figure 10:
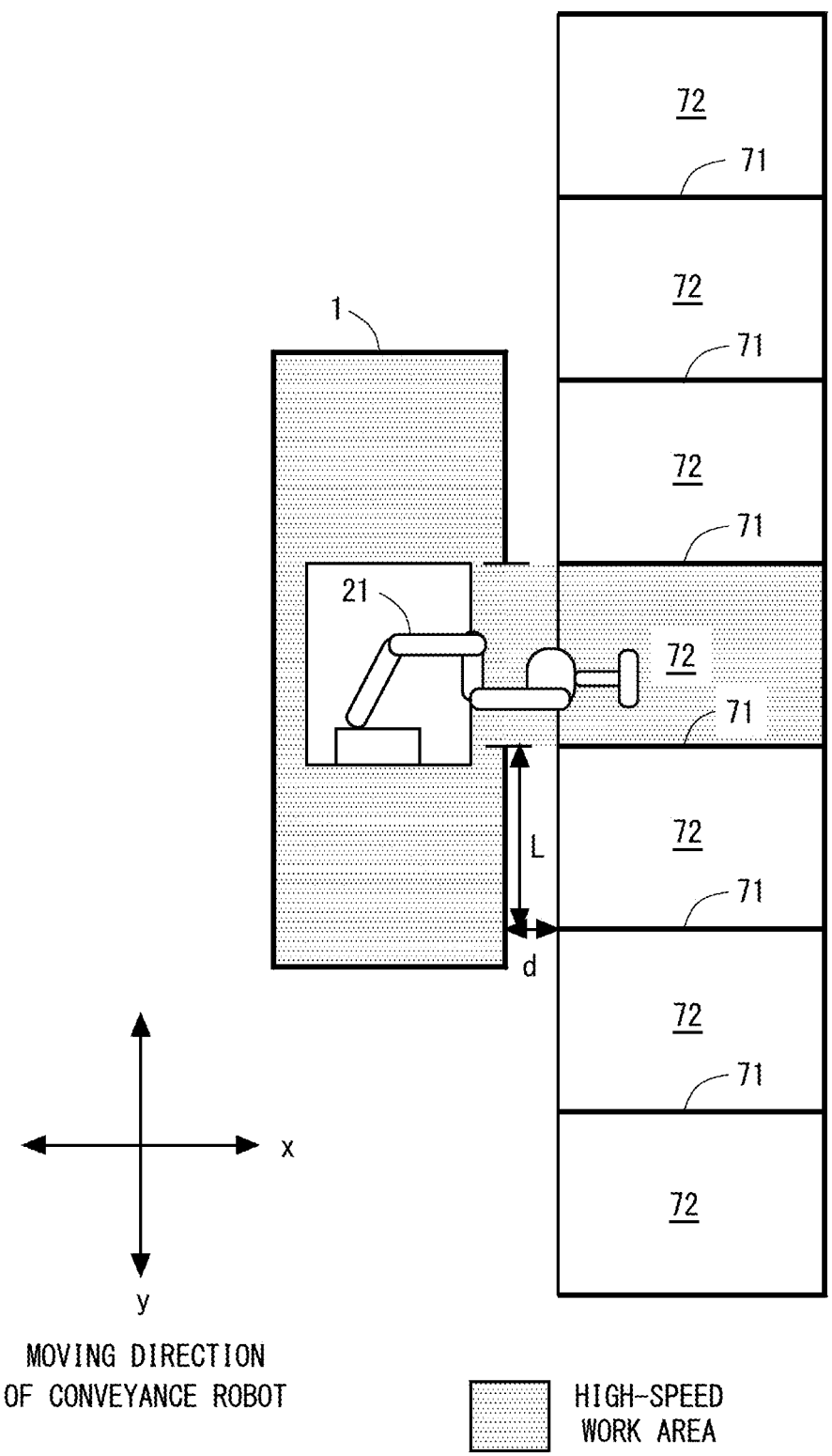
FIG. 10 is a diagram for explaining an operation state during a pickup work in the conveyance robot system according to the first embodiment.

Next, an operation during the pickup operation in the conveyance robot system according to the first embodiment will be described. An overview of the operation during the pickup operation in the conveyance robot system according to the embodiment 1 will be described with reference to FIGS. 9 and 10. FIG. 9 is a diagram for explaining the operation state of the pickup operation preparation step in the conveyance robot system according to the first embodiment. FIG. 10 is a diagram for explaining the operation state during the pickup operation in the conveyance robot system according to the first embodiment.

As shown in FIGS. 9 and 10, in the conveyance robot system according to the first embodiment, a high-speed work allowance threshold Dth is set for a distance between the surface of the conveyance robot 1 on which the arm opening 11 is provided and the surface of the shelf facing the surface of the conveyance robot 1 on which the arm opening 11 is provided. In the conveyance robot system according to the first embodiment, when a clearance distance d, which is the distance between the surface of the conveyance robot 1 on which the arm opening 11 is provided and the surface of the shelf facing the surface of the conveyance robot 1 on which the arm opening 11 is provided, is larger than the high-speed work allowance threshold Dth, the intrusion detection sensors 40 of the conveyance robot 1 are effectively operated and the speed limit of the robot arm 21 is removed only inside the safety cover 10 of the conveyance robot 1. In the conveyance robot system according to the first embodiment, when the clearance distance d, which is the distance between the surface of the conveyance robot 1 on which the arm opening 11 is provided and the surface of the shelf facing the surface of the conveyance robot 1 on which the arm opening 11 is provided, becomes less than or equal to the high-speed work allowance threshold Dth, the intrusion detection sensors 40 of the conveyance robot 1 are disabled, and the speed limit of the robot arm 21 of the conveyance robot 1 is removed both inside the workpiece storage area 72 adjacent to the arm opening 11 and inside the safety cover 10. In FIGS. 9 and 10, an area where the speed limit of the robot arm 21 is removed is hatched as a high-speed work area. From another point of view, in the conveyance robot system according to the first embodiment, the operation speed of the robot arm 21 may be limited in areas other than the high-speed work area hatched in FIGS. 9 and 10.

Further, the high-speed work allowance threshold Dth set in the conveyance robot system according to the first embodiment is set as a distance at which a part of a person, particularly a hand, inserted into the clearance between the conveyance robot 1 and the shelf cannot reach the high-speed work area. In particular, in the conveyance robot 1 according to the first embodiment, the length of the housing of the conveyance robot 1 (the length of the housing in the y direction) is set to be longer than the workpiece partition plate 71 of the workpiece storage area 72 adjacent to the workpiece storage area 72 set in the high-speed work area. Therefore, the high-speed work allowance threshold Dth is set so that even if a part of a person is inserted from the clearance, whose length is the clearance distance d, a part of the person inserted beyond the clearance distance between adjacent workpiece partition plates 71 does not reach the high-speed work area.

More specifically, the high-speed work allowance threshold Dth is determined based on the following condition. When the ratio of the clearance distance d, which is the distance between the flat surface of the arm entry/exit surface of the conveyance robot 1 on which the arm opening 11 is provided and the shelf surface to the distance L from the point of the clearance distance d to the movable range area, which is a movable range of the robot arm 21, becomes ⅙ or less, the conveyance robot system according to the first embodiment sets the movable range area to a high-speed work area that ensures safety. If the above condition is satisfied, d=L/6, and the high-speed work allowance threshold value Dth is set to L/6. The clearance distance d is a distance between the flat surface of the surface where the arm opening 11 is provided and the workpiece storage area 70 or the workpiece partition plate 71. In the example shown in FIGS. 9 and 10, the distance L is a distance between the workpiece partition plate 71 in an area to be recognized as a high-speed work area and another workpiece partition plate 71 adjacent to the workpiece partition plate 71.

In the conveyance robot system according to the first embodiment, when the clearance distance d becomes L/6 or less, it is determined that the movable range area, which is the area outside the safety cover 10 where the robot arm 21 is operated, satisfies the safety ensuring condition that can regard safety of the movable range area as equivalent to the safety inside the safety cover 10. Thus, the conveyance robot system according to the first embodiment allows the robot arm 21 to perform a work while projecting toward the shelf.

Figure 11:
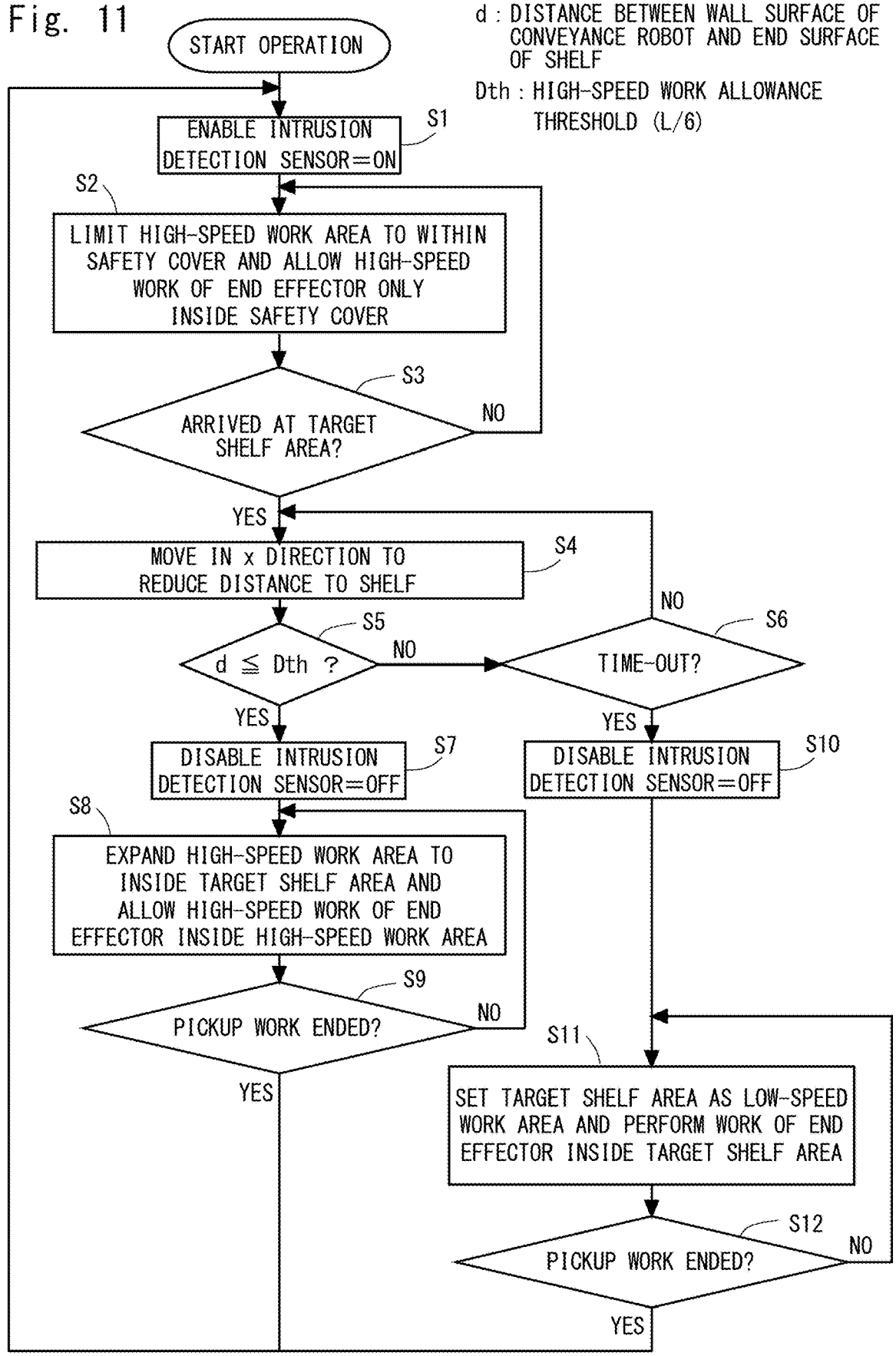
FIG. 11 is a flowchart for explaining an operation of the conveyance robot according to the first embodiment.

Next, processing for performing the pickup work in the conveyance robot system according to the first embodiment will be described. FIG. 11 is a flowchart for explaining the operation of the conveyance robot according to the first embodiment. In FIG. 11, the processing in the pickup work is described as the processing performed by the conveyance robot 1. However, the processing shown in FIG. 11 may be performed by the entire conveyance robot system, and the processing need not be completed inside the conveyance robot 1.

As shown in FIG. 11, when the conveyance robot 1 starts an operation, it enables the intrusion detection sensors 40 and limits the high-speed work area to inside the safety cover 10 (Step S1). The conveyance robot 1 limits the high-speed work area to inside the safety cover 10 until it arrives at the target shelf area, and allows high-speed works of the end effector only inside the safety cover 10 (Steps S2 and S3).

Next, when the conveyance robot 1 arrives at the target shelf area, the conveyance robot 1 moves in parallel in the lateral direction to reduce the clearance distance d between the shelf and the conveyance robot 1 using the distance sensor 41 (Steps S3 and S4). The clearance distance d here is, as described above, the distance between the surface on which the arm opening 11 of the conveyance robot 1 is provided and the surface of the shelf facing the surface on which the arm opening 11 of the conveyance robot 1 is provided.

When the clearance distance d becomes less than or equal to the high-speed work allowance threshold Dth, the conveyance robot 1 disables the intrusion detection sensors 40, recognizes the workpiece partition plate 71 located at a position opposed to the arm opening 11 as the high-speed work area, allows the high-speed operations of the end effector in the expanded high-speed work area, and maintains this state until the work is completed (Steps S5 and S7 to S9). When the pickup work is completed, the conveyance robot 1 returns the processing to Step S1. Here, the disabling of the intrusion detection sensors 40 means a state in which the detection results of the intrusion detection sensors 40 do not affect the operation of the system, such as stopping the operation of the intrusion detection sensors 40, ignoring the detection results of the intrusion detection sensors 40, and shutting off the power supply of the intrusion detection sensors 40.

On the other hand, if the clearance distance d does not become less than or equal to the high-speed work allowance threshold Dth even if the preset time-out time is exceeded, the conveyance robot 1 disables the intrusion detection sensors 40, does not recognize the target shelf area as the high-speed work area, performs a pickup work in a state in which the operation speed of the end effector is reduced, and maintains this state until the work is completed (Steps S5, S6, and S10 to S12). When the pickup work is completed, the conveyance robot 1 returns the processing to Step S1.

As described above, in the conveyance robot system according to the first embodiment, when the conveyance robot 1 is brought close to the shelf to reduce the clearance between the shelf and the conveyance robot 1, so that a part of the person does not enter the high-speed work area set by the conveyance robot 1 while no speed limit is imposed, the robot arm 21 protrudes from the safety cover 10 and performs a work in the workpiece storage area 72.

Thus, in the conveyance robot system according to the first embodiment, safety of a worker working together with the conveyance robot 1 is ensured while operating the robot arm 21 without imposing any limitation on the operation speed.

In the conveyance robot 1 according to the first embodiment, by providing the arm opening 11 with the intrusion detection sensors 40, it is possible to detect an intrusion of a part of a person from the arm opening 11 into the safety cover 10, and to ensure safety such as reducing the operation speed of the robot arm 21.

Further, in the conveyance robot system according to the first embodiment, when the distance between the conveyance robot 1 and the shelf cannot be reduced to less than or equal to the high-speed work allowance threshold Dth, the pickup work is performed with the reduced operation speed of the robot arm 21. Thus, in the conveyance robot system according to the first embodiment, the safety of the worker coexisting with the conveyance robot 1 can be enhanced.

Second Embodiment

In a second embodiment, another embodiment of the method for controlling the conveyance robot 1 in the conveyance robot system according to the first embodiment will be described. In the description of the second embodiment, the same components as those according to the first embodiment are denoted by the same reference signs as those of the first embodiment, and the description thereof is omitted.

In the conveyance robot system according to the first embodiment, when the conveyance robot 1 performs a pickup work in the workpiece storage areas 72 located at the left and right ends of the shelf, even if the clearance distance d is less than or equal to the high-speed work allowance threshold Dth, the distance L between a part whose distance between the conveyance robot 1 and the shelf becomes the clearance distance d and the movable range area set as the high-speed work area becomes almost zero. This causes a problem that it cannot be guaranteed that a part of a person does not enter the high-speed work area. Therefore, in the conveyance robot system according to the second embodiment, processing to address such a problem is performed in addition to the control of the conveyance robot 1 according to the first embodiment.

Figure 12:
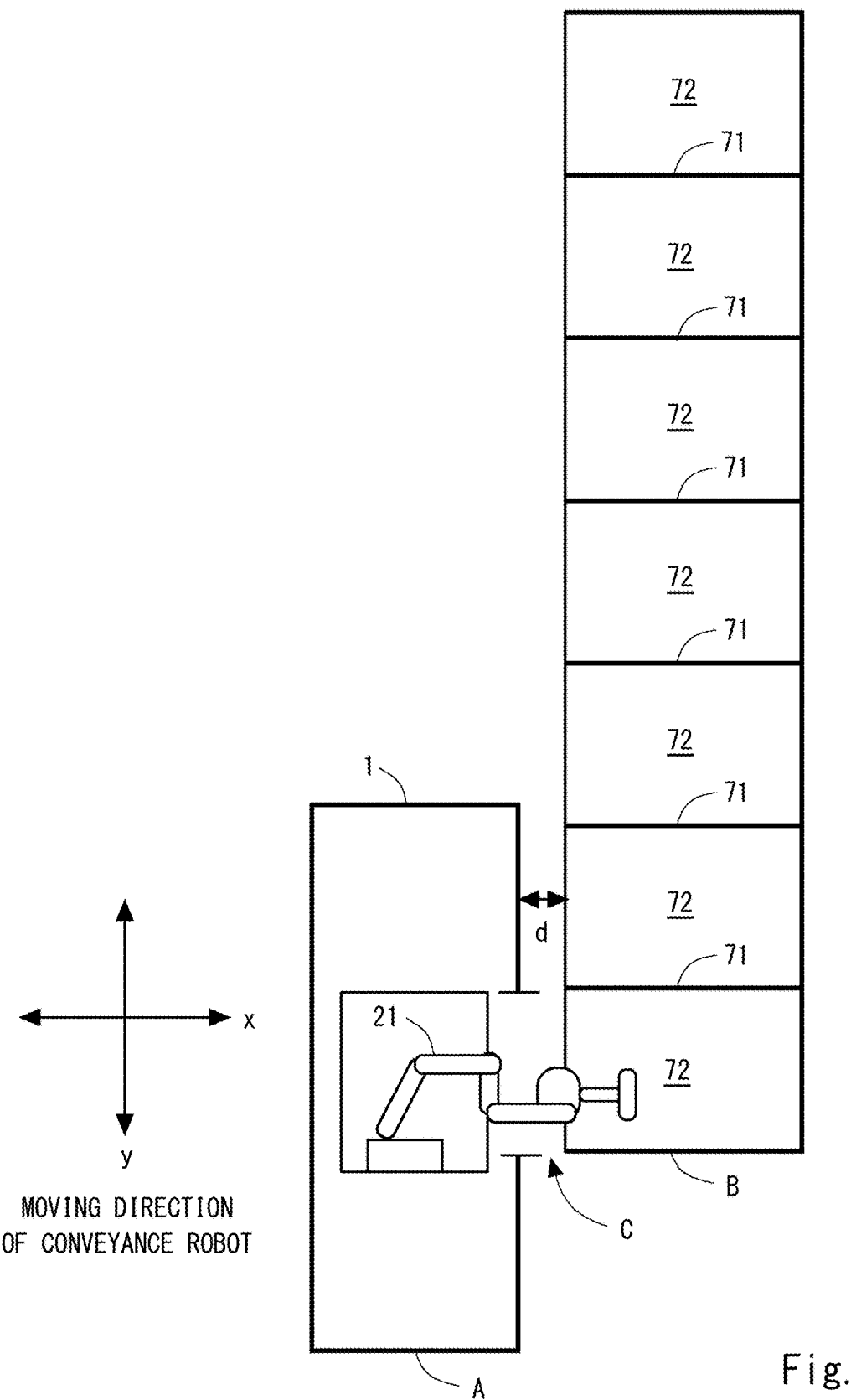
FIG. 12 is a diagram for explaining an operation state during pickup work in the conveyance robot system according to a second embodiment.

First, FIG. 12 is a diagram for explaining an operation state during a pickup work in the conveyance robot system according to the second embodiment. The operation state shown in FIG. 12 describes a state in which characteristic processing is performed in the conveyance robot system according to the second embodiment. In the operation state shown in FIG. 12, an end part A of the conveyance robot 1 in the y direction protrudes from an end part B of the shelf in the y direction. In this case, in the conveyance robot system according to the first embodiment, the conveyance robot 1 is moved so that the clearance distance d is reduced to be less than the high-speed work allowance threshold Dth. Thus, in the conveyance robot system according to the first embodiment, a part of a person is prevented from entering an area to be a movable range of the robot arm 21 from a clearance C between the conveyance robot 1 and the shelf.

Figure 13:
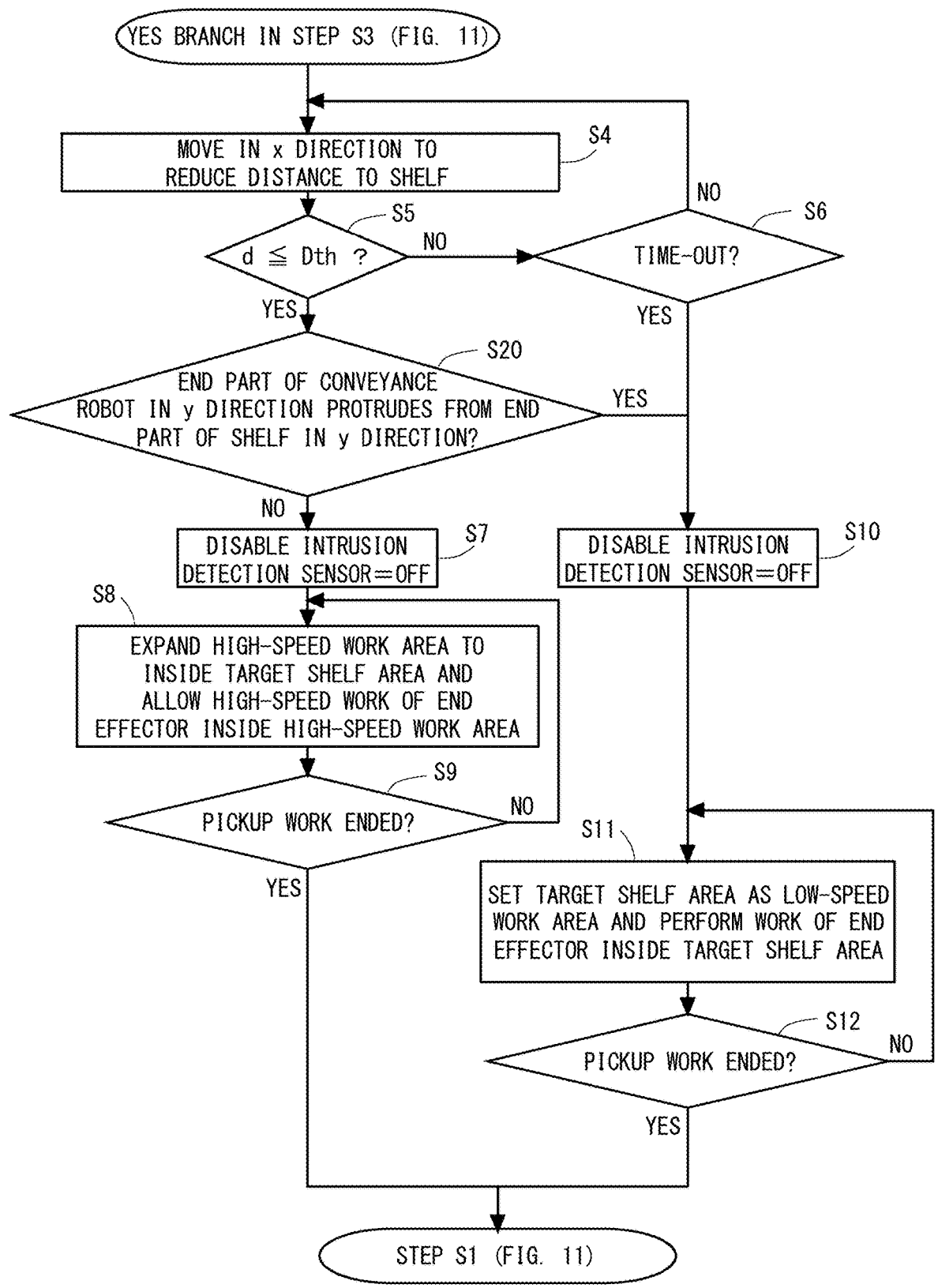
FIG. 13 is a flowchart for explaining an operation of the conveyance robot according to the second embodiment.

Next, an operation of the system management server 2 according to the second embodiment will be described. FIG. 13 is a flowchart for explaining the operation of the conveyance robot according to the second embodiment. The flowchart shown in FIG. 13 shows processing of the processing from Step S4 onward of the processing explained using FIG. 11 and further including characteristic processing in the conveyance robot system according to the second embodiment.

As shown in FIG. 13, in the conveyance robot system according to the second embodiment, after the clearance distance d becomes less than or equal to the high-speed work allowance threshold Dth in Step S5, it is determined whether or not the end part A of the conveyance robot 1 in the y direction protrudes from the end part B of the shelf in the y direction (Step S20). Note that the determination in Step S20 can be made by the conveyance robot 1 based on the position of the workpiece storage area 72 where the pickup work is to be performed, by the conveyance robot 1 calculating a relative position between the shelf and the conveyance robot 1 based on the position information acquired from the position acquisition unit 62, or by using the surrounding environment sensors 35 and 36.

If it is determined in Step S20 that the end part A of the conveyance robot 1 in the y direction protrudes from the end part B of the shelf in the y direction, the conveyance robot 1 disables the intrusion detection sensors 40 (Step S10), sets the workpiece storage area 72, which is the target shelf area, as a low-speed work area, and performs the work in the workpiece storage area 72 while reducing the operation speed of the robot arm 21 (Step S11). On the other hand, if it is determined in Step S20 that the end part A of the conveyance robot 1 in the y direction does not protrude from the end part B of the shelf in the y direction, the conveyance robot 1 picks up the object in the workpiece storage area 72 without reducing the operation speed in a manner similar to the conveyance robot system according to the first embodiment (Step S8).

That is, in the example shown in FIG. 13, the surface of the conveyance robot 1, in which the arm opening 11 is provided and the arm enters and exits, from among the surfaces of the shelf, which is referred to as an arm entry/exit surface, has a flat surface that is parallel to the surface of the shelf facing the conveyance robot 1 and in which the objects are loaded and unloaded, which is referred to as an object loaded/unloaded surface. The conveyance robot 1 reduces the operation speed of the robot arm 21 when a part of the flat surface of the arm entry/exit surface protrudes from the object loaded/unloaded surface of the shelf.

Figure 14:
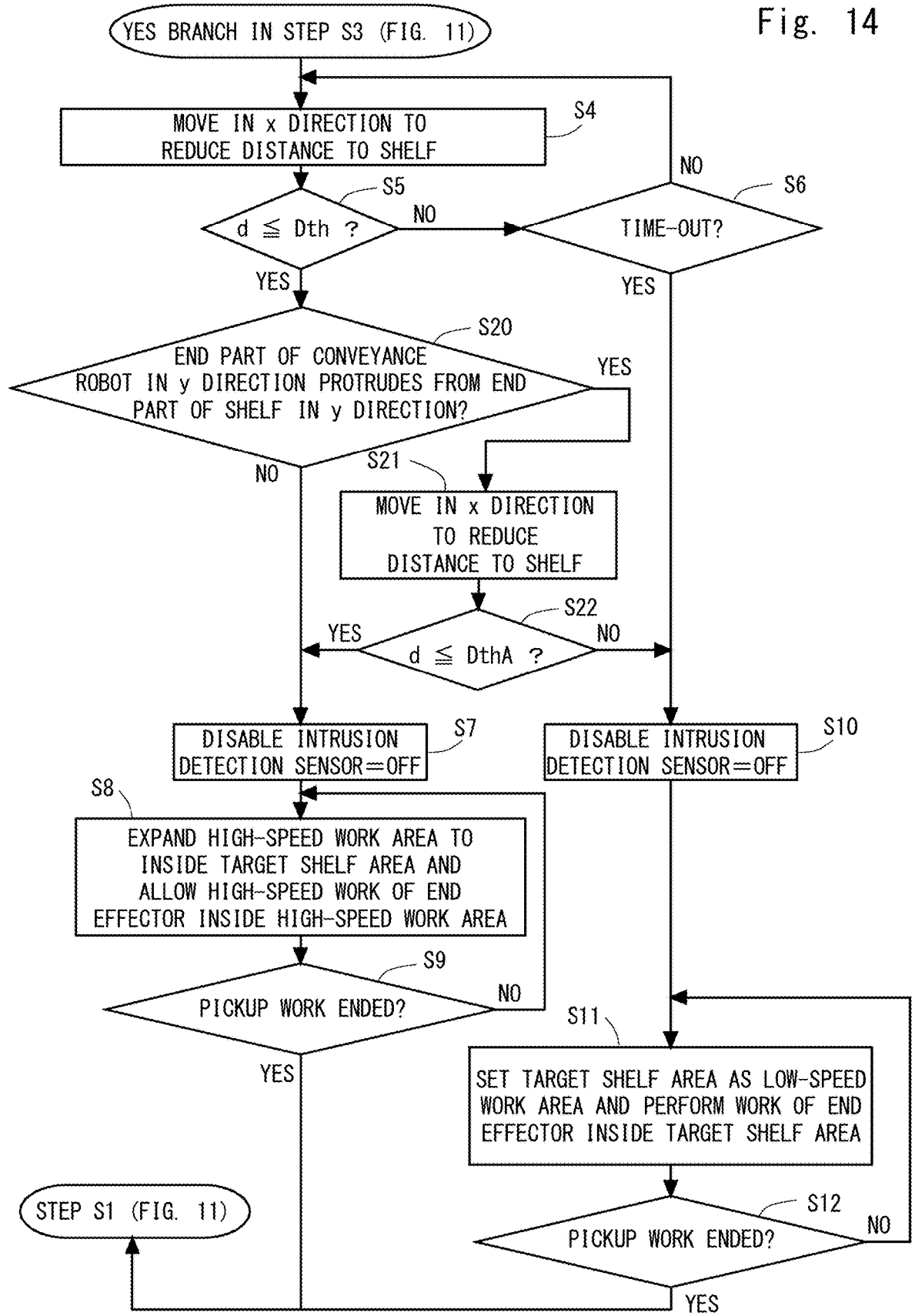
FIG. 14 is a flowchart for explaining another operation of the conveyance robot according to the second embodiment.

Further, in the conveyance robot system according to the second embodiment, it is possible to perform a pickup work without reducing the operation speed of the robot arm 21 even in the workpiece storage areas 72 located at the left and right end parts of the shelf. FIG. 14 is a flowchart for explaining another operation of the conveyance robot according to the second embodiment.

In another operation of the conveyance robot according to the second embodiment shown in FIG. 14, if it is determined in Step S20 that the end part A of the conveyance robot 1 in the y direction protrudes from the end part B of the shelf in the y direction, the distance between the conveyance robot 1 and the shelf is further reduced in such a way that the conveyance robot 1 moves in the x direction (Step S21). If the clearance distance d is smaller than a high-speed work allowance threshold DthA set as a value smaller than the high-speed work allowance threshold Dth, the target workpiece storage area 72 is set as the high-speed work area (Step S22: YES). On the other hand, if the clearance distance d does not become smaller than the high-speed work allowance threshold DthA by the operation of Step S21, the target workpiece storage area 72 is set as the low-speed work area (Step S22: NO).

That is, in another operation example of the conveyance robot system according to the second embodiment, the surface of the conveyance robot 1, in which the arm opening 11 is provided and the arm enters and exits, from among the surfaces of the shelf, which is referred to as an arm entry/exit surface, has a flat surface that is parallel to the surface of the shelf facing the conveyance robot 1 and in which the objects are loaded and unloaded, which is referred to as an object loaded/unloaded surface. When a part of the flat surface of the arm entry/exit surface protrudes from the loaded/unloaded surface of the shelf, the conveyance robot 1 brings the conveyance robot closer to the shelf so that the clearance distance becomes smaller than the normal value of the high-speed work allowance threshold.

Note that the high-speed work allowance threshold DthA is set as a value having such a magnitude that it is difficult for a person to insert even a part of his/her body such as a finger even in a narrow clearance that may allow an entry of a part of his/her body such as a finger.

As described above, in the conveyance robot system according to the second embodiment, it is possible to ensure the safety of the conveyance robot 1 and the worker who coexist with the conveyance robot 1 even when the distance between the part, which is the end part of the shelf and whose distance becomes the clearance distance d when the conveyance robot 1 is brought close to the shelf, and the area where the robot arm 21 operates becomes extremely small.

Specifically, in the operation example shown in FIG. 13, the conveyance robot system according to the second embodiment reduces the operation speed of the robot arm 21 to ensure safety when a clearance c that may allow a part of a person to enter only when the clearance distance d becomes the high-speed work allowance threshold Dth is generated. In another operation example shown in FIG. 14, when the clearance c that may allow a part of a person to enter only when the clearance distance d becomes the high-speed work allowance threshold Dth is generated, the conveyance robot system according to the second embodiment ensures the safety by not reducing the operation speed of the robot arm 21 if the clearance distance d becomes less than or equal to the high-speed work allowance threshold DthA, which is smaller than the high-speed work allowance threshold Dth, and by reducing the operation speed of the robot arm 21 if the clearance distance d is greater than the high-speed allowance threshold DthA.

Third Embodiment

In a third embodiment, another embodiment of a shelf in which an object to be picked up by the conveyance robot 1 according to the first embodiment is stored will be described. Further, in the conveyance robot system according to the third embodiment, the state of limitation on the operation speed of the robot arm 21 is switched in accordance with the specification of the shelf. In the description of the third embodiment, the same components as those described in the first embodiment are denoted by the same reference signs as those in the first embodiment, and the description thereof is omitted.

Figure 15:
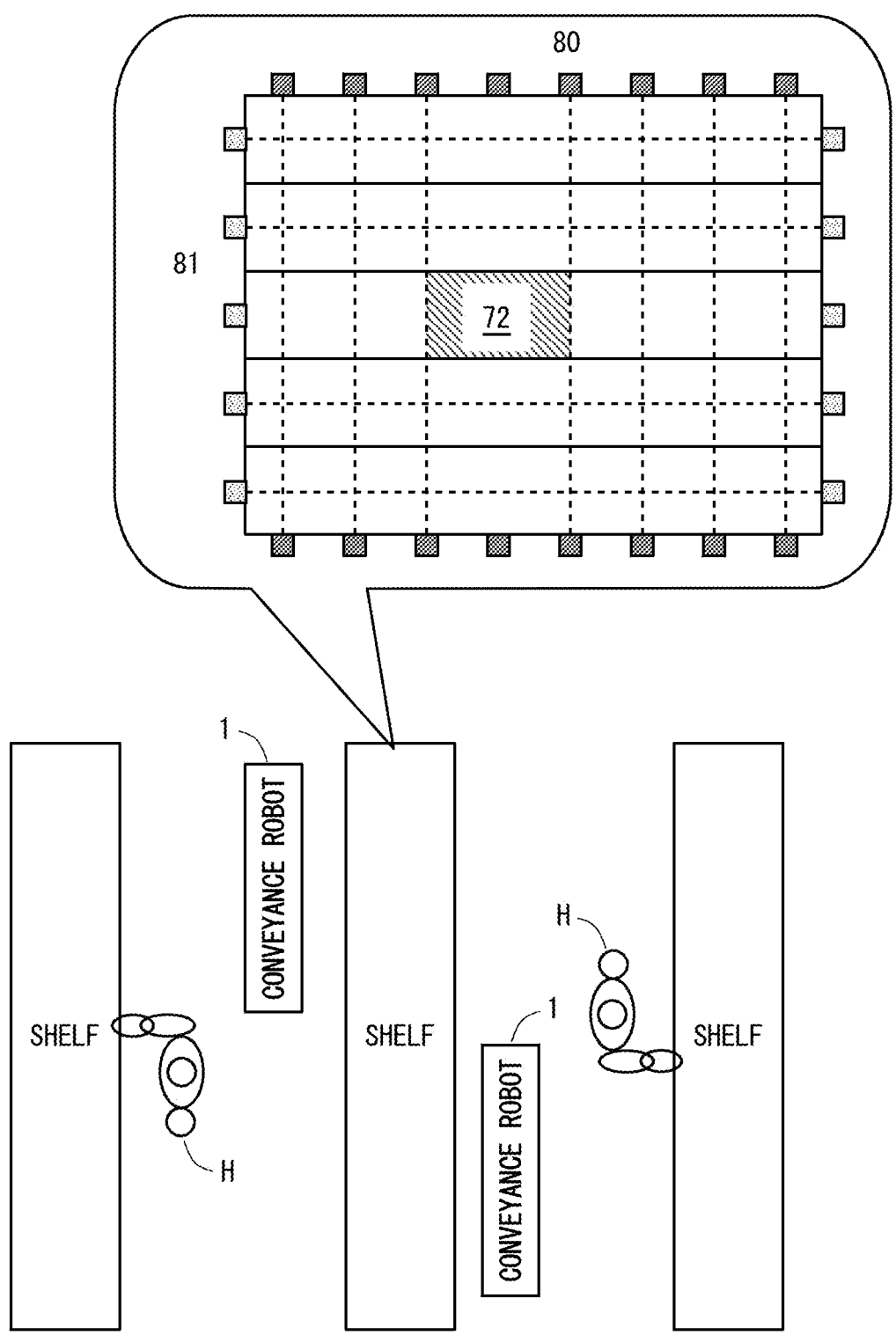
FIG. 15 shows an overview for explaining a structure of a shelf in a conveyance robot system according to a third embodiment.

FIG. 15 shows an overview for explaining the structure of a shelf in the conveyance robot system according to the third embodiment. As shown in FIG. 15, the shelf according to the third embodiment includes shelf area intrusion detection sensors 80 and 81 in place of the workpiece partition plates 71. In the shelf according to the third embodiment, the shelf area intrusion detection sensors 80 and 81 detect an intruding object from the surface of the shelf facing the conveyance robot 1 from among the surfaces of the shelf. In the example shown in FIG. 15, the shelf area intrusion detection sensor 80 transmits and receives a detection signal for detecting an intruding object in the vertical direction of the shelf, and the shelf area intrusion detection sensor 81 transmits and receives a detection signal for detecting an intruding object in the horizontal direction of the shelf. The system management server 2 or the conveyance robot 1 sends an instruction to the shelf according to the third embodiment so that the sensor is disabled only in the area where the object to be picked up is stored. Thus, in the shelf according to the third embodiment, an area that is made available by the disabled shelf area intrusion detection sensors 80 and 81 is defined as a workpiece storage area 72 into which the robot arm 21 can intrude.

Figure 16:
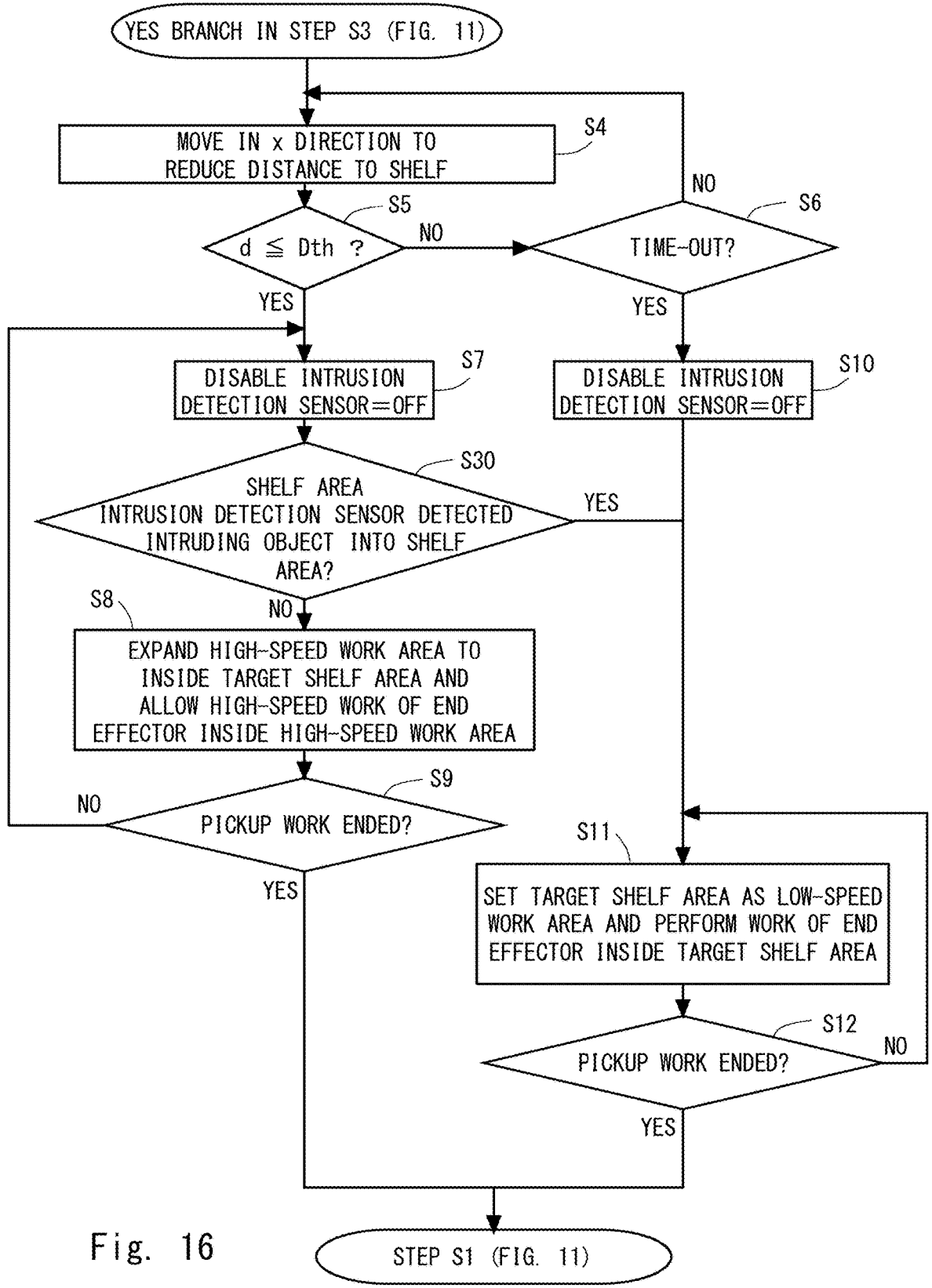
FIG. 16 is a flowchart for explaining an operation of the conveyance robot according to the third embodiment.

Next, the operation of the conveyance robot system according to the third embodiment will be described. FIG. 16 is a flowchart for explaining the operation of the conveyance robot 1 according to the third embodiment. As shown in FIG. 16, the conveyance robot 1 according to the third embodiment changes the setting so as to set the workpiece storage area 72 as a low speed area and switches to a mode for reducing the operation speed of the robot arm 21 when an intruding object into the shelf area is detected by the shelf area intrusion detection sensors 80 and 81 while the workpiece storage area 72 is set as the high-speed work area and the robot is working without limitation on the operation speed of the robot arm 21 in in Step S5 (Step S30).

That is, in the conveyance robot 1 according to the third embodiment, when the arm entry/exit surface of the conveyance robot 1 is brought close to the shelf on which the object is placed so that the distance between them becomes less than or equal to the high-speed work allowance threshold Dth, if it is determined that another object has entered the shelf area, the operation speed of the robot arm 21 is reduced even if the area of the shelf on which the object is placed is an open area into which another object can enter from another place.

From the above description, in third embodiment, even when there is no workpiece partition plate 71 in the shelf, when intrusion into the shelf is detected by the shelf area intrusion detection sensors 80 and 81, the operation speed of the robot arm 21 is reduced to ensure safety of the worker, and when an area where the shelf is present is an area where it is confirmed that there is no intrusion of an intruding object, the operation speed of the robot arm 21 is controlled without limitation.

Fourth Embodiment

In a fourth embodiment, another embodiment of the method for controlling the conveyance robot 1 in the conveyance robot system according to the first embodiment will be described. In the description of the fourth embodiment, the same components as those described in the first embodiment are denoted by the same reference signs as those in the first embodiment, and the description thereof is omitted.

In the conveyance robot system according to the fourth embodiment, an area where the distance from the conveyance robot 1 is within a predetermined range is set as a safety ensured area. When it is determined that there is no person in the safety ensured area, the conveyance robot system disables the intrusion detection sensors 40 to allow the robot arm 21 to perform a work while projecting from the arm opening part 11 without limiting the operation speed thereof regardless of the magnitude of the clearance distance d.

Here, a method for controlling the conveyance robot 1 in the conveyance robot system according to the first embodiment will be described in detail. FIG. 17 is a flowchart for explaining the operation of the conveyance robot 1 according to the fourth embodiment. As shown in FIG. 17, the control of the conveyance robot 1 in the conveyance robot system according to the fourth embodiment is the same as the method for controlling the conveyance robot 1 in the conveyance robot system according to the first embodiment shown in FIG. 11 (Steps S1 to S12 of FIG. 11) and further includes the processing of Steps S40 to S44.

In the method for controlling the conveyance robot 1 of the conveyance robot system according to the fourth embodiment, first, it is confirmed whether or not there is a person in the safety ensured area set around the conveyance robot 1 (Step S40). If it is determined in Step S40 that there is a person in the safety ensured area, the conveyance robot system according to the fourth embodiment controls the conveyance robot 1 by the same control method as in first embodiment. However, in the conveyance robot system according to the fourth embodiment, the processing from Step S40 to Step S3 is repeated until it is determined in Step S3 whether or not the conveyance robot 1 has arrived at the target shelf area.

On the other hand, if it is determined in Step S40 that there is no person in the safety ensured area, in the conveyance robot system according to the fourth embodiment, the intrusion detection sensors 40 of the conveyance robot 1 are disabled to allow the robot arm 21 to operate at a speed without limitation (Step S41). Then, the conveyance robot system allows the robot arm 21 to perform a pickup work by protruding the robot arm 21 from the arm opening 11 without limitation on the operation while continuing a detection of a person entering the safety ensured area (Steps S42 to S44). When the presence of a person is detected in the safety ensured area in Step S43, the conveyance robot system controls the conveyance robot 1 based on the same control method as in the first embodiment. If no person is detected in the safety ensured area in Step S43, it is determined in Step S44 whether or not the pickup work has been completed. If it is determined in Step S44 that the pickup work has not been completed, the conveyance robot system repeats the processing of Steps S41 to S44. If it is determined in Step S44 that the pickup work has been completed, the conveyance robot system returns the processing to Step S40.

As described above, in the conveyance robot system according to the fourth embodiment, if there is no person in the safety ensured area, the time for which a work can be performed without limiting the operation speed of the robot arm 21 can be made longer than when the conveyance robot 1 is controlled based on the control method according to the first embodiment.

Further, in the conveyance robot system according to the fourth embodiment, if there is no person in the safety ensured area, the operation of reducing the clearance distance d between the shelf and the conveyance robot 1 becomes unnecessary, thereby reducing the time required for the pickup work by the conveyance robot 1.

Furthermore, in the conveyance robot system according to the fourth embodiment, when there is a person in the safety ensured area, the conveyance robot 1 is controlled by the same control method as that of the conveyance robot system according to the first embodiment, so that the safety of the surrounding people can be improved without reducing the operation speed of the robot arm 21 even when the person and the conveyance robot 1 coexist.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance robot system comprising:
   a conveyance robot; and
   a robot control unit configured to control picking up an object by the conveyance robot, wherein
   the conveyance robot comprises:
   a robot arm with an end effector for holding the object and configured to move a position of the end effector;
   a wheel configured to move a housing;
   a safety cover configured to cover the housing and including an arm opening from which the robot arm is extended and in which the robot arm is retracted;
   a storage box space for placing a storage box for storing the object in the safety cover;
   an intrusion detection sensor configured to detect an intrusion of an object into the arm opening; and
   a distance sensor configured to measure a clearance distance between an arm entry/exit surface and a shelf, the arm entry/exit surface being a surface of the safety cover, and the shelf being where the object is stored, wherein
   the robot control unit is configured to determine that a movable range area, which is outside the safety cover where the robot arm is operated, satisfies a safety ensuring condition where safety of the movable range area is equivalent to safety inside the safety cover and allow the robot arm to perform work while projecting toward the shelf, and
   the robot control unit is configured to determine that the safety of the movable range area is equivalent to the safety inside the safety cover when a ratio of the clearance distance to the movable range area becomes $\frac{1}{6}$ or less.

2. The conveyance robot system according to claim 1, wherein
   the arm entry/exit surface includes a flat surface parallel to an object loaded/unloaded surface of the shelf facing the conveyance robot, and
   the robot control unit is configured to bring the conveyance robot closer to the shelf so that the clearance distance becomes smaller regardless of the safety ensuring condition when a part of the flat surface of the arm entry/exit surface protrudes from the object loaded/unloaded surface of the shelf.

3. The conveyance robot system according to claim 1, wherein
   when it is determined that an area of the shelf on which the object is placed is an area into which another object can intrude from another place when the arm entry/exit surface is brought closer to the shelf on which the object is placed in such a way that a distance between the arm entry/exit surface and the shelf on which the object is placed becomes less than that when the safety ensuring condition is satisfied, the robot control unit is configured to reduce an operation speed of the robot arm.

4. The conveyance robot system according to claim 1, further comprising a shelf sensor configured to detect an intrusion of an object from an object loaded/unloaded surface of the shelf facing the conveyance robot, wherein the robot control unit is configured to reduce an operation speed of the robot arm when the shelf sensor detects the intrusion of the object into the shelf.

5. The conveyance robot system according to claim 4, wherein when the shelf sensor does not detect the intrusion of the object from the object loaded/unloaded surface, the robot control unit is configured not to reduce an operation speed of the robot arm during a pickup work for the shelf from which the object is being picked up.

6. The conveyance robot system according to claim 1, wherein the robot control unit is configured control an operation speed of the robot arm without reducing the operation speed of the robot arm when the robot control unit determines that there is no person in a safety ensured area within a predetermined range around the conveyance robot.

7. The conveyance robot system according to claim 1, wherein the robot control unit is inside the conveyance robot.

8. The conveyance robot system according to claim 1, wherein the movable range area is bounded at least in part between the shelf and an obstruction closest to the shelf.

9. The conveyance robot system according to claim 8, wherein the obstruction is another shelf.

10. A conveyance robot system comprising:
a conveyance robot; and
a robot control unit configured to control picking up an object by the conveyance robot, wherein
the conveyance robot comprises:
a robot arm with an end effector for holding the object and configured to move a position of the end effector;
a wheel configured to move a housing;
a safety cover configured to cover the housing and including an arm opening from which the robot arm is extended and in which the robot arm is retracted;
a storage box space for placing a storage box for storing the object in the safety cover;
an intrusion detection sensor configured to detect an intrusion of an object into the arm opening; and
a distance sensor configured to measure a clearance distance between an arm entry/exit surface and a shelf, the arm entry/exit surface being a surface of the safety cover, and the shelf being where the object is stored, wherein the robot control unit is configured to determine that a movable range area, which is outside the safety cover where the robot arm is operated, satisfies a safety ensuring condition where safety of the movable range area is equivalent to safety inside the safety cover and allow the robot arm to perform work while projecting toward the shelf, and the robot control unit is configured to reduce an operation speed of the robot arm under two conditions:
when the intrusion detection sensor detects the intrusion of the object into the safety cover and
when the intrusion detection sensor is disabled because the clearance distance does not satisfy the safety ensuring condition.

11. A conveyance robot system comprising:
a conveyance robot; and
a robot control unit configured to control picking up an object by the conveyance robot, wherein
the conveyance robot comprises:
a robot arm with an end effector for holding the object and configured to move a position of the end effector;
a wheel configured to move a housing;
a safety cover configured to cover the housing and including an arm opening from which the robot arm is extended and in which the robot arm is retracted;
a storage box space for placing a storage box for storing the object in the safety cover;
an intrusion detection sensor configured to detect an intrusion of an object into the arm opening; and
a distance sensor configured to measure a clearance distance between an arm entry/exit surface and a shelf, the arm entry/exit surface being a surface of the safety cover, and the shelf being where the object is stored, wherein the robot control unit is configured to determine that a movable range area, which is outside the safety cover where the robot arm is operated, satisfies a safety ensuring condition where safety of the movable range area is equivalent to safety inside the safety cover and allow the robot arm to perform work while projecting toward the shelf, the arm entry/exit surface includes a flat surface parallel to an object loaded/unloaded surface of the shelf facing the conveyance robot, and the robot control unit is configured to reduce an operation speed of the robot arm when a part of the flat surface of the arm entry/exit surface protrudes from the object loaded/unloaded surface of the shelf.

* * * * *